(12) United States Patent
Bates et al.

(10) Patent No.: US 6,456,307 B1
(45) Date of Patent: *Sep. 24, 2002

(54) AUTOMATIC ICON GENERATION

(75) Inventors: Cary Lee Bates; Brian John Cragun; Paul Reuben Day, all of Rochester, MN (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/150,401

(22) Filed: Sep. 9, 1998

(51) Int. Cl.[7] .................................. G06F 3/00
(52) U.S. Cl. .................. 345/838; 345/835; 345/779
(58) Field of Search ............... 345/348, 349, 345/350, 351, 334, 335, 838, 835–837, 839, 779; 707/529, 515, 501.1, 513

(56) References Cited

U.S. PATENT DOCUMENTS

| | | | | |
|---|---|---|---|---|
| 5,349,658 A | * | 9/1994 | O'Rourke et al. | 345/349 |
| 5,414,809 A | * | 5/1995 | Hogan et al. | 345/349 |
| 5,548,692 A | * | 8/1996 | Cok | 345/433 |
| 5,579,471 A | * | 11/1996 | Barber et al. | 345/326 |
| 5,680,558 A | * | 10/1997 | Hatanaka et al. | 345/334 |
| 5,689,718 A | * | 11/1997 | Sakurai et al. | 707/517 |
| 5,717,940 A | * | 2/1998 | Peairs | 707/515 |
| 5,761,655 A | | 6/1998 | Hoffman | 707/4 |
| 5,765,176 A | * | 6/1998 | Bloomberg | 345/634 |
| 5,946,678 A | * | 8/1999 | Aalbersberg | 707/3 |
| 5,963,964 A | * | 10/1999 | Nielsen | 707/501 |
| 5,982,369 A | * | 11/1999 | Sciammarella et al. | 345/349 |
| 6,002,401 A | * | 12/1999 | Baker | 345/349 |
| 6,133,916 A | * | 10/2000 | Bukszar et al. | 345/335 |
| 6,182,072 B1 | * | 1/2001 | Leak et al. | 707/10 |
| 6,243,091 B1 | * | 6/2001 | Berstis | 345/839 |
| 6,278,448 B1 | * | 8/2001 | Brown et al. | 345/866 |
| 6,300,947 B1 | * | 10/2001 | Kanevsky | 345/804 |

OTHER PUBLICATIONS

Microsoft Corporation, "Microsoft Win32 Programmer's reference", Copyright 1992–1996.

* cited by examiner

*Primary Examiner*—Kristine Kincaid
*Assistant Examiner*—Sy D. Luu
(74) *Attorney, Agent, or Firm*—Owen J. Gamon; Roy W. Truelson

(57) ABSTRACT

A mechanism for automatically generating icons. In the preferred embodiment, a browser displays a web page in a window on a display screen. The browser selects a subset of the page, and transforms the subset to an icon. The browser then displays the icon, which represents the browser and the page, on the display screen. Thus, when multiple invocations of the browser are active, each invocation will have a different, associated icon, depending on each invocation's current page. In this way, the user can easily distinguish between the browser invocations by viewing the different icons.

53 Claims, 24 Drawing Sheets

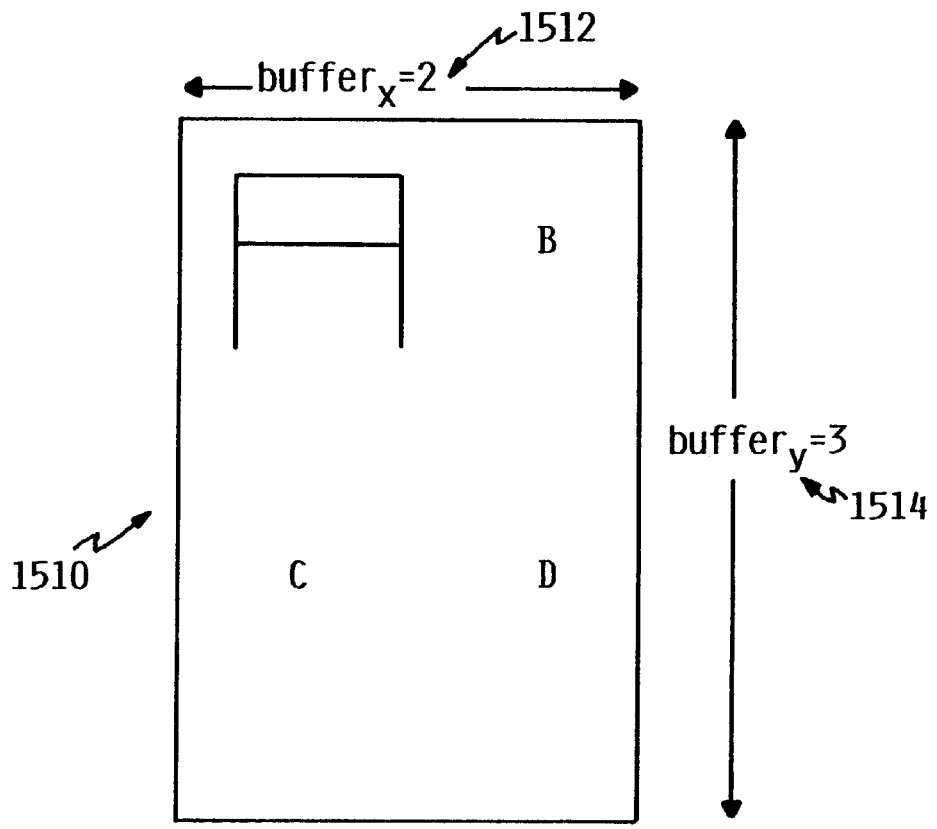
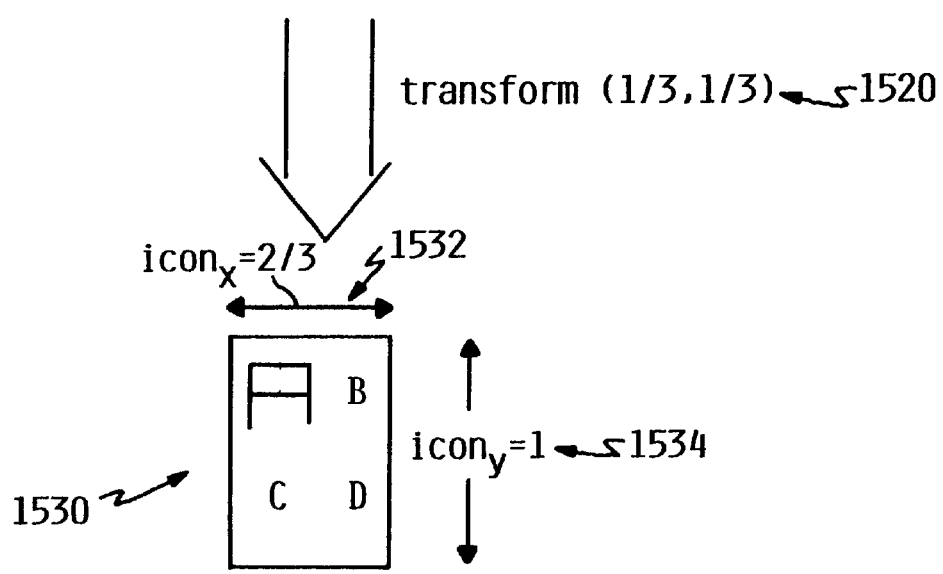
FIG. 15

AUTOMATIC ICON GENERATION

FIELD OF THE INVENTION

The present invention relates in general to improved information processing systems. In particular, the present invention relates to a method and system for the generation of image icons.

BACKGROUND

The development of distributed, computer networks, such as the Internet, allows users to retrieve vast amounts of electronic information previously unavailable. The Internet increasingly is displacing more conventional means of information transmission, such as newspapers, magazines, and even television.

Electronic information transferred between computer networks (e.g., the Internet) can be presented to a user in hypertext, a metaphor for presenting information in a manner in which text, images, sounds, and actions become linked together in a complex, non-sequential web of associations that permit the user to "browse" through related topics, regardless of the presented order of the topics. For example, traveling among links to the word "iron" in an article might lead the user to the periodic table of the chemical elements (i.e., linked by the word "iron"), or to a reference to the use of iron in weapons in Europe in the Dark Ages. The term "hypertext" is used to describe documents, as presented by a computer, that express the nonlinear structure of ideas, as opposed to the linear format of books, film, and speech. The combination of hypertext documents connected by their links in the Internet is referred to as the World Wide Web (WWW).

Networked computers utilizing hypertext conventions typically follow a client/server architecture. A "client" is usually a computer that requests a service provided by another computer (i.e., a server). A "server" is typically a remote computer system accessible over information to the user as responses to the client. The client typically contains a program, called a browser, that communicates the requests to the server and formats the responses for viewing (browsing) at the client. The browser retrieves a web page from the server and displays it to the user at the client. A "web page" (also referred to as a "page") is a data file, or document, written in a hyper-text language that may have hyperlinks, text, graphic images, and even multimedia objects, such as sound recordings or video clips, associated with that data file.

The user can create multiple instances, or invocations, of the browser, each simultaneously running in a window on the display screen and each displaying a web page. Since space on a display screen is limited, the user may choose to minimize one or more of the browser instances. Minimizing a browser creates an icon, which is a small image—plus minimal, associated text—that represents the browser. In the future, when the user wishes to see the web page again, the user can select the icon using mouse or other pointing device, which causes the browser and its web page to be restored to full view. Over time, the user may accumulate many icons, which can be small and not easily distinguishable, especially because the images in each browser icon are identical since the icon represents the browser and not the web page (it is only the minimal, associated text that might relate to the web page). In addition to the browser, a user might also have many other windows open or minimized as icons. This creates additional clutter on the display and causes the user even more difficulty when searching for the desired icon.

Thus, users often spend much time squinting at small icons, trying to remember which icon is associated with which web page or window. Some operating systems allow the user to place the pointing-device pointer over the icon, which creates bubble text that provides a description of the associated web page or window, but this is time consuming when the user has many icons from which to choose, and the text is not always helpful. Some icons have minimal, associated text that relates to the web page, but not all do and the space for such text is quite limited.

Thus, there is a need for a mechanism that creates icons that are easily distinguishable.

SUMMARY OF THE INVENTION

The invention is a method and system for automatically generating icons. In the preferred embodiment, a browser displays a web page in a window on a display screen. The browser selects a subset of the page, and transforms the subset to an icon. The browser then displays the icon, which represents the browser and the page, on the display screen. Thus, when multiple invocations of the browser are active, each invocation will have a different, associated icon, depending on each invocation's current page. In this way, the user can easily distinguish between the browser invocations by viewing the different icons.

BRIEF DESCRIPTION OF THE INVENTION

Figure 13:
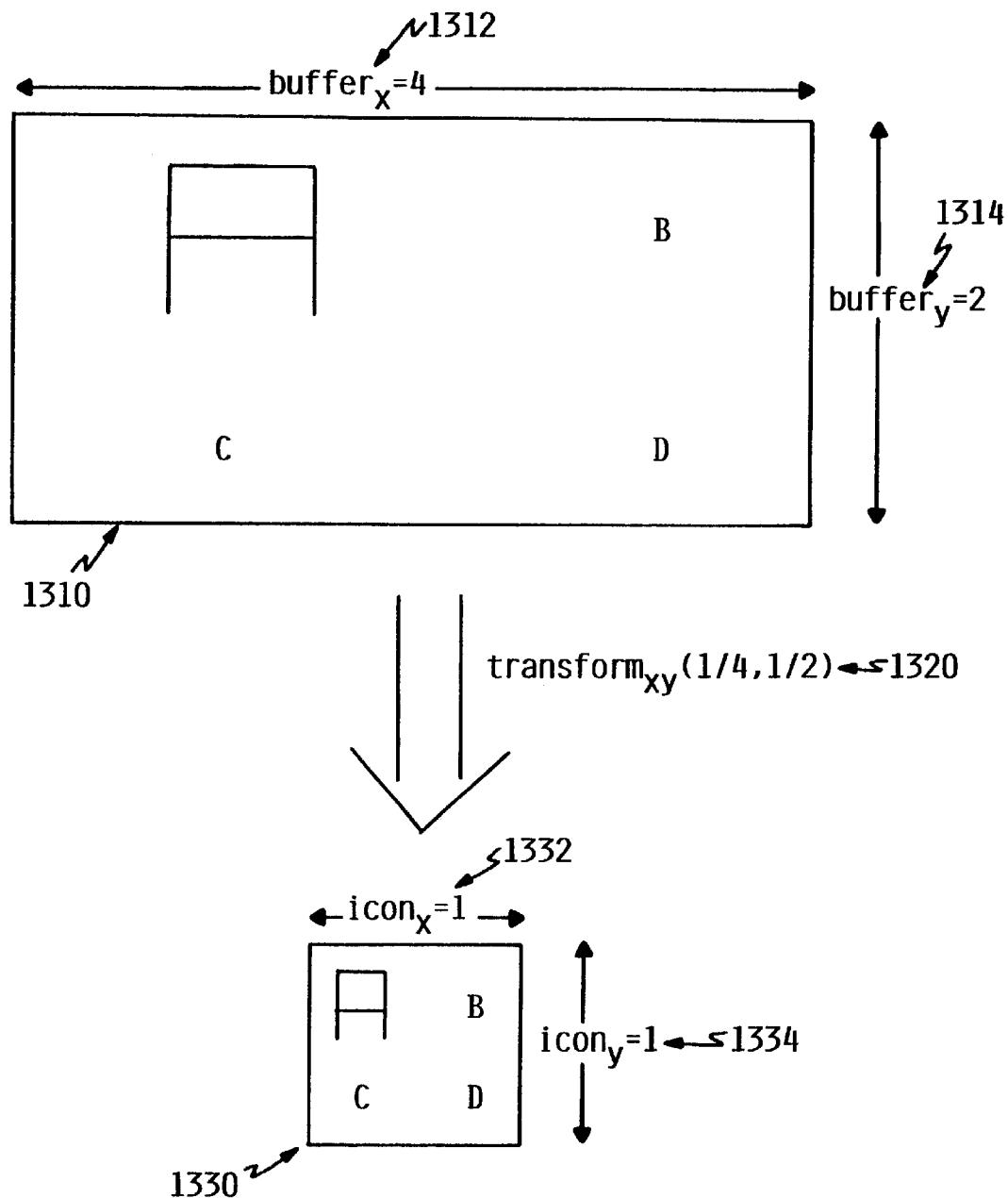
Figure 14:
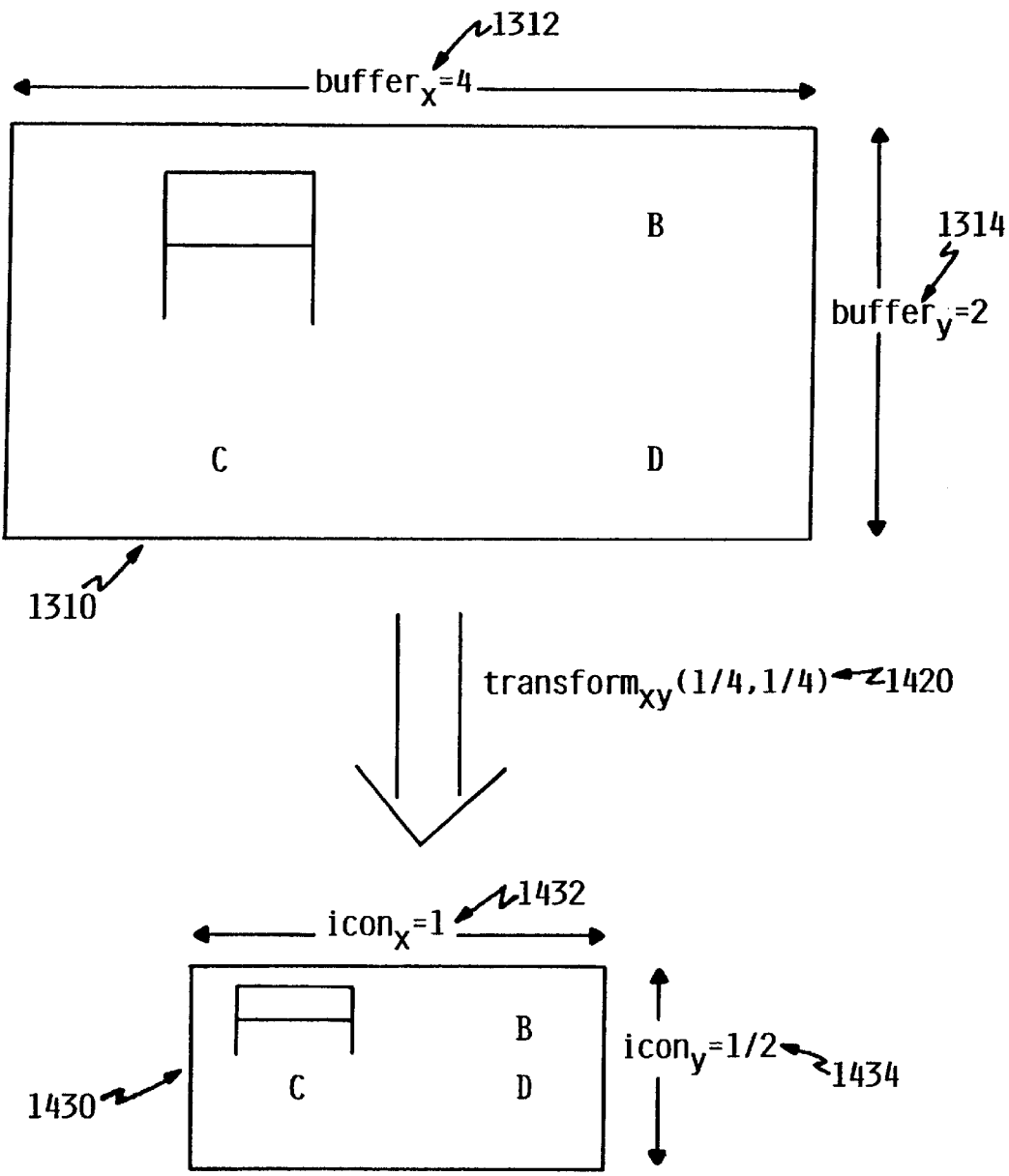

FIGS. 13, 14, and 15 are pictorial representations of the buffer-to-icon transformation performed by the preferred embodiment.

FIGS. 16, 17, 18, 19, 20, and 21 are flowcharts that describe the operation of the preferred embodiment.

DESCRIPTION OF THE PREFERRED EMBODIMENTS

Technology Overview

The development of computerized distributed information resources, such as the "Internet," allows users to link with servers and networks, and thus retrieve vast amounts of electronic information heretofore unavailable in an electronic medium. Such electronic information increasingly is displacing more conventional means of information transmission, such as newspapers, magazines, and even television. The term "Internet" is an abbreviation for "Internetwork," and refers commonly to a collection of computer networks that utilize the TCP/IP suite of protocols, well-known in the art of computer networking. TCP/IP is an acronym for "Transport Control Protocol/internet Protocol," a software protocol developed by the Department of Defense for facilitating communications between computers.

Electronic information transferred between computer networks (e.g., the Internet) can be presented to a user in hypertext, a metaphor for presenting information in a manner in which text, images, sounds, and actions become linked together in a complex non-sequential web of associations that permit the user to "browse" through related topics, regardless of the presented order of the topics. These links are often established by both the author of a hypertext document and by the user, depending on the intent of the hypertext document. For example, traveling among links to the word "iron" in an article displayed within a graphical user interface in a computer system might lead the user to the periodic table of the chemical elements (i.e., linked by the word "iron"), or to a reference to the use of iron in weapons in Europe in the Dark Ages. The term "hypertext" is utilized to describe documents, as presented by a computer, that express the nonlinear structure of ideas, as opposed to the linear format of books, film, and speech.

Hypertext, especially in an interactive format where choices are controlled by the user, is structured around the idea of offering a working and learning environment that parallels human thinking—that is, an environment that allows the user to make associations between topics rather than moving sequentially from one topic to the next, as in an alphabetic list. Hypertext topics are linked in a manner that allows users to jump from one subject to other related subjects during a search for information.

Networked systems utilizing hypertext conventions typically follow a client/server architecture. A "client" is a member of a class or group that utilizes the services of another class or group to which it is not related. In the context of a computer network such as the Internet, a client is a process (i.e., roughly a program or task) that requests a service provided by another program. The client process utilizes the requested service without having to know any working details about the other program or the service itself. In networked systems, a client is usually a computer that accesses shared network resources provided by another computer (i.e., a server).

A server is typically a remote computer system accessible over a communications medium such as the Internet. The server scans and searches for information sources. Based upon such requests by the user, the server presents filtered electronic information to the user as server responses to the client process. The client process may be active in a first computer system, and the server process may be active in a second computer system; the processes communicate with one another over a communications medium that allows multiple clients to take advantage of the information-gathering capabilities of the server. A server can thus be described as a network computer that runs administrative software that controls access to all or part of the network and its resources, such as data on a disk drive. A computer acting as a server makes resources available to computers acting as workstations on the network.

Client and server can communicate with one another utilizing the functionality provided by a hypertext transfer protocol (HTTP). The World Wide Web (WWW) or, simply, the "web," includes all servers adhering to this protocol, which are accessible to clients via a Uniform Resource Locator (URL) address. Internet services can be accessed by specifying Uniform Resource Locators that have two basic components: a protocol to be used and an object pathname. For example, the Uniform Resource Locator address, "http://www.uspto.gov/web/menu/intro.html" is an address to an introduction about the U.S. Patent and Trademark Office). The URL specifies a hypertext transfer protocol ("http") and a name ("www.uspto.gov") of the server. The server name is associated with a unique numeric value (i.e., a TCP/IP address). The URL also specifies the name of the file that contains the text ("intro.html") and the hierarchical directory ("web") and subdirectory ("menu") structure in which the file resides on the server. A directory is a grouping of files on the server that usually contain related information. A subdirectory is a division within a directory. A URL might contain any number of directories and subdirectories. The delimiter that separates the various identifier components of the URL is a "/". The most-narrow identifier in the hierarchical pathname is the filename, "intro.html". The most-broad identifier in the pathname is the server name, "www.uspto.gov".

Active within the client is a first process, known as a "browser" that establishes the connection with the server, sends HTTP requests to the server, receives HTTP responses from the server, and presents information to the user. The server itself executes corresponding server software that presents information to the client in the form of HTTP responses. The HTTP responses correspond to "web pages" constructed from a Hypertext Markup Language (HTML), or other server-generated data.

The browser retrieves a web page from the server and displays it to the user at the client. A "web page" (also referred to as a "page" or a "document") is a data file written in a hyper-text language, such as HTML, that may have text, graphic images, and even multimedia objects, such as sound recordings or moving video clips associated with that data file. The page contains control tags and data. The control tags identify the structure: for example, the headings, subheadings, paragraphs, lists, and embedding of images. The data consists of the contents, such as text or multimedia, that will be displayed or played to the user. A browser interprets the control tags and formats the data according to the structure specified by the control tags to create a viewable object that the browser displays, plays, or otherwise performs to the user. A control tag may direct the browser to retrieve a page from another source and place it at the location specified by the control tag. In this way, the browser can build a viewable object that contains multiple components, such as spreadsheets, text, hotlinks, pictures, sound, and video objects. A web page can be constructed by loading one or more separate files into an active directory or file structure that is then displayed as a viewable object within a graphical user interface. A hyperlink is a link to a web page. The hyperlink is often presented to the user as a button in a web page, which the user may select, which causes the browser to retrieve the linked web-page.

The user can create multiple instances of the browser, each simultaneously running in a window on the display screen and each displaying a web page. Since space on a display screen is limited, the user may choose to minimize one or more of the browser instances. Minimizing a browser creates an icon, which is a small image—plus minimal, associated text—that represents the browser and the retrieved web page. In the future, when the user wishes to see the web page again, the user can select the icon using mouse or other pointing device, which causes the browser and its web page to be restored to full view.

DETAILED DESCRIPTION

Figure 1:
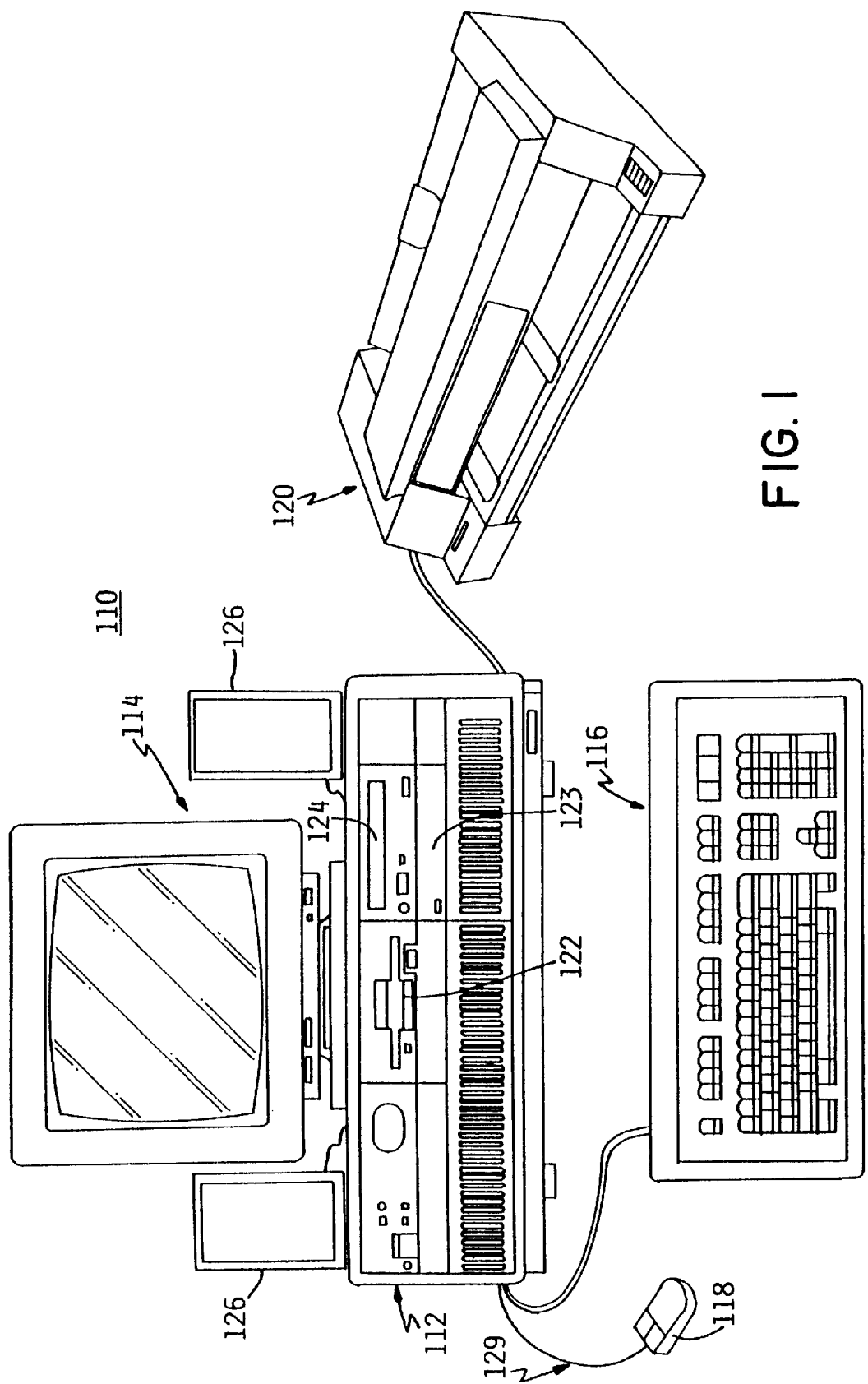
FIG. 1 is a pictorial representation of a computer system that may be utilized to implement a preferred embodiment.

With reference now to the figures and in particular with reference to FIG. 1, there is depicted an embodiment of a computer system that may be utilized to implement the preferred embodiment. Computer system 110 includes processing unit 112, display device 114, keyboard 116, pointing device 118, printer 120, and speakers 126. Processing unit 112 receives input data from input devices such as keyboard 116, pointing device 118, and local area network interfaces (not illustrated) and presents output data to a user via display device 114, printer 120, and speakers 126. Pointing device 118 is preferably utilized in conjunction with a graphical user interface (GUI) in which hardware components and software objects are controlled through the selection and the manipulation of associated graphical objects displayed within display device 114. Although computer system 110 is illustrated with a mouse for pointing device 118, other graphical-pointing devices such as a graphic tablet, joystick, track ball, touch pad, or track pad could also be utilized.

Keyboard 116 is that part of computer system 110 that resembles a typewriter keyboard and that enables a user to control particular aspects of the computer. Because information flows in one direction, from keyboard 114 to processing unit 112, keyboard 116 functions as an input-only device. Functionally, keyboard 116 represents half of a complete input/output device, the output half being video display terminal 114. Keyboard 116 includes a standard set of printable characters presented in a QWERTY pattern typical of most typewriters. In addition, keyboard 116 includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video display terminal 114.

Video-display terminal 114 is the visual output of computer system 110. As indicated herein, video-display terminal 114 can be a cathode-ray tube (CRT) based video display well-known in the art of computer hardware. But, with a portable or notebook-based computer, video display terminal 114 can be replaced with a liquid crystal display (LCD) based or gas, plasma-based, flat-panel display.

Pointing device 118 features a casing with a flat bottom that can be gripped by a human hand. Pointing device 118 can include buttons on the top, a multidirectional detection device such as a ball on the bottom, and cable 129 that connects pointing device 118 to processing unit 112.

To support storage and retrieval of data, processing unit 112 further includes diskette drive 122, hard-disk drive 123, and CD-ROM drive 124, which are interconnected with other components of processing unit 112.

Computer system 110 can be implemented utilizing any suitable computer such as the IBM Aptiva computer, a product of International Business Machines Corporation, located in Armonk, N.Y. But, a preferred embodiment of the present invention can apply to any hardware configuration that allows the creating of icons, regardless of whether the computer system is a complicated, multi-user computing apparatus, a single-user workstation, or a network appliance that does not have non-volatile storage of its own.

Figure 2:
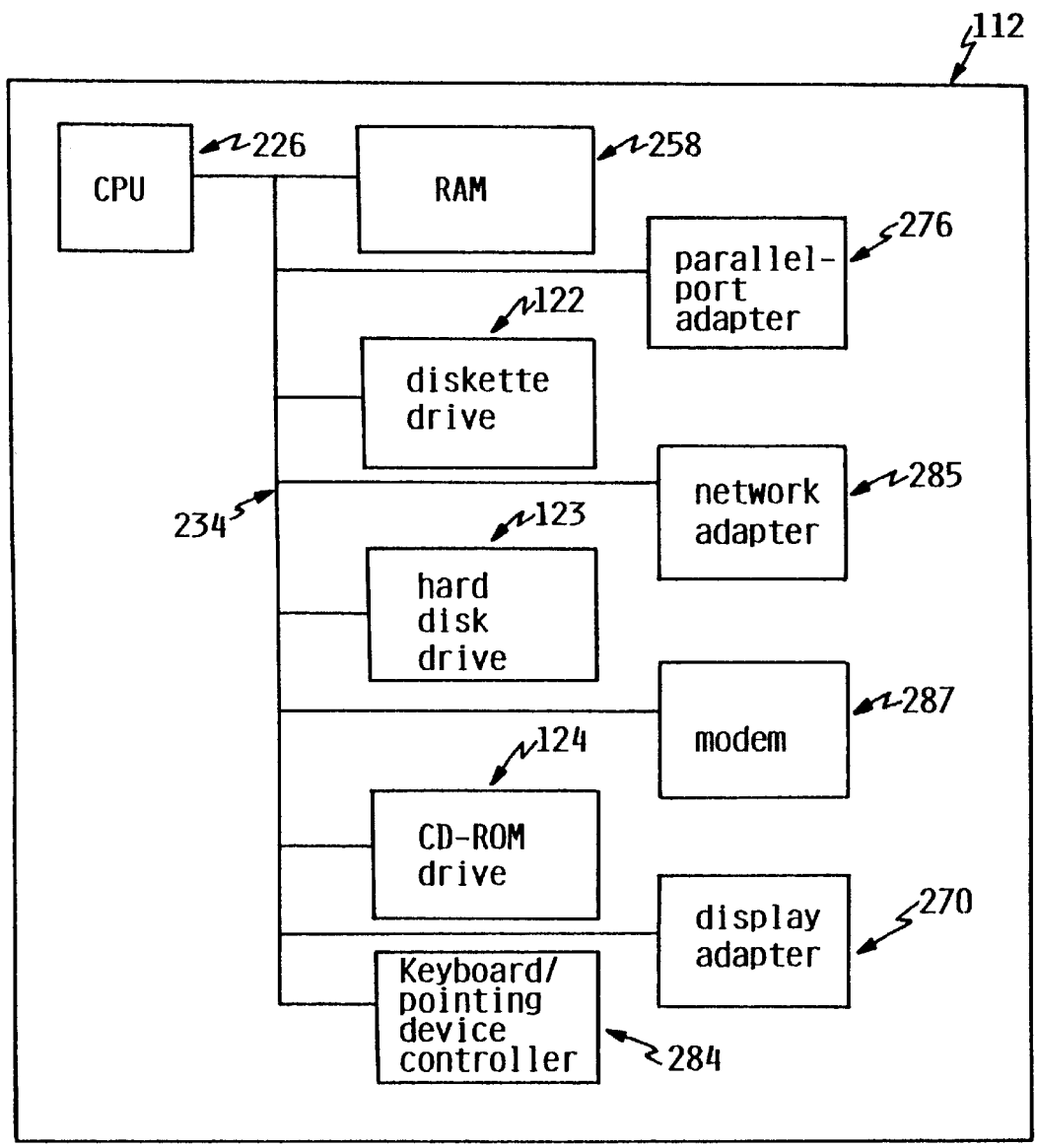
FIG. 2 is a block diagram of a representative hardware environment of the processing unit of the computer system illustrated in FIG. 1.

Referring to FIG. 2, there is depicted a block diagram of the principal components of processing unit 112. CPU 226 is connected via system bus 234 to RAM (Random Access Memory) 258, diskette drive 122, hard-disk drive 123, CD-ROM drive 124, keyboard/pointing-device controller 284, parallel-port adapter 276, network adapter 285, display adapter 270, and modem 287. Although the various components of FIG. 2 are drawn as single entities, each may consist of a plurality of entities and may exist at multiple levels.

Processing unit 112 includes central processing unit (CPU) 226, which executes instructions. CPU 226 includes the portion of computer system 110 that controls the operation of the entire computer system, including executing the arithmetical and logical functions contained in a particular computer program. Although not depicted in FIG. 2, CPU 226 typically includes a control unit that organizes data and program storage in a computer memory and transfers the data and other information between the various parts of the computer system. CPU 226 generally includes an arithmetic unit that executes the arithmetical and logical operations, such as addition, comparison, and multiplication. CPU 226 accesses data and instructions from and stores data to volatile RAM 258.

CPU 226 can be implemented as one of the 80×86 or Pentium processors, or any other type of processor, which are available from a number of vendors. Although computer system 110 is shown to contain only a single CPU and a single system bus, the present invention applies equally to computer systems that have multiple CPUs and to computer systems that have multiple buses that each perform different functions in different ways.

RAM 258 comprises a number of individual volatile memory modules that store segments of operating system and application software while power is supplied to computer system 110. The software segments are partitioned into one or more virtual memory pages that each contain a uniform number of virtual memory addresses. When the execution of software requires more pages of virtual memory than can be stored within RAM 258, pages that are not currently needed are swapped with the required pages, which are stored within non-volatile storage devices 122 or 123. RAM 258 is a type of memory designed such that the location of data stored in it is independent of the content. Also, any location in RAM 258 can be accessed directly without needing to start from the beginning.

Hard disk drive 123 and diskette drive 122 are electromechanical devices that read from and write to disks. The main components of a disk drive are a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from computer system 110. A disk itself is typically a round, flat piece of flexible plastic (e.g., floppy disk) or inflexible metal (e.g. hard disk) coated with a magnetic material that can be electrically influenced to hold information recorded in digital form. A disk is, in most computers, the primary method for storing data on a permanent or semipermanent basis. Because the magnetic coating of the disk must be protected from damage and contamination, a floppy disk (e.g., 5.25 inch) or micro-floppy disk (e.g., 3.5 inch) is encased in a protective plastic jacket. But, any size of disk could be used. A hard disk, which is very finely machined, is typically enclosed in a rigid case and can be exposed only in a dust free environment.

Keyboard/pointing-device controller 284 interfaces processing unit 112 with keyboard 116 and graphical-pointing device 118. In an alternative embodiment, keyboard 116 and graphical-pointing device 118 have separate controllers.

Display adapter 270 translates graphics data from CPU 226 into video signals utilized to drive display device 114.

Finally, processing unit 112 includes network adapter 285, modem 287, and parallel-port adapter 276, which facilitate communication between computer system 110 and peripheral devices or other computer systems. Parallel-port adapter 276 transmits printer-control signals to printer 120 through a parallel port. Network adapter 285 connects computer system 110 to an unillustrated local area network (LAN). A LAN provides a user of computer system 110 with a means of electronically communicating information, including software, with a remote computer or a network logical-storage device. In addition, a LAN supports distributed processing, which enables computer system 110 to share a task with other computer systems linked to the LAN.

Modem 287 supports communication between computer system 110 and another computer system over a standard telephone line. Furthermore, through modem 287, computer system 110 can access other sources such as a server, an electronic bulletin board, and the Internet or World Wide Web.

The configuration depicted in FIG. 1 is but one possible implementation of the components depicted in FIG. 2. Portable computers, laptop computers, and network computers or Internet appliances are other possible configurations. The hardware depicted in FIG. 2 may vary for specific applications. For example, other peripheral devices such as optical-disk media, audio adapters, or chip-programming devices, such as PAL or EPROM programming devices well-known in the art of computer hardware, may be utilized in addition to or in place of the hardware already depicted.

As will be described in detail below, aspects of the preferred embodiment pertain to specific method steps implementable on computer systems. In an alternative embodiment, the invention may be implemented as a computer program-product for use with a computer system. The programs defining the functions of the preferred embodiment can be delivered to a computer via a variety of signal-bearing media, which include, but are not limited to, (a) information permanently stored on non-writable storage media (e.g., read only memory devices within a computer such as CD-ROM disks readable by CD-ROM drive 124); (b) alterable information stored on writable storage media (e.g., floppy disks within diskette drive 122 or hard-disk drive 123); or (c) information conveyed to a computer by a communications media, such as through a computer or telephone network, including wireless communications. Such signal-bearing media, when carrying computer-readable instructions that direct the functions of the present invention, represent alternative embodiments of the present invention.

Figure 3:
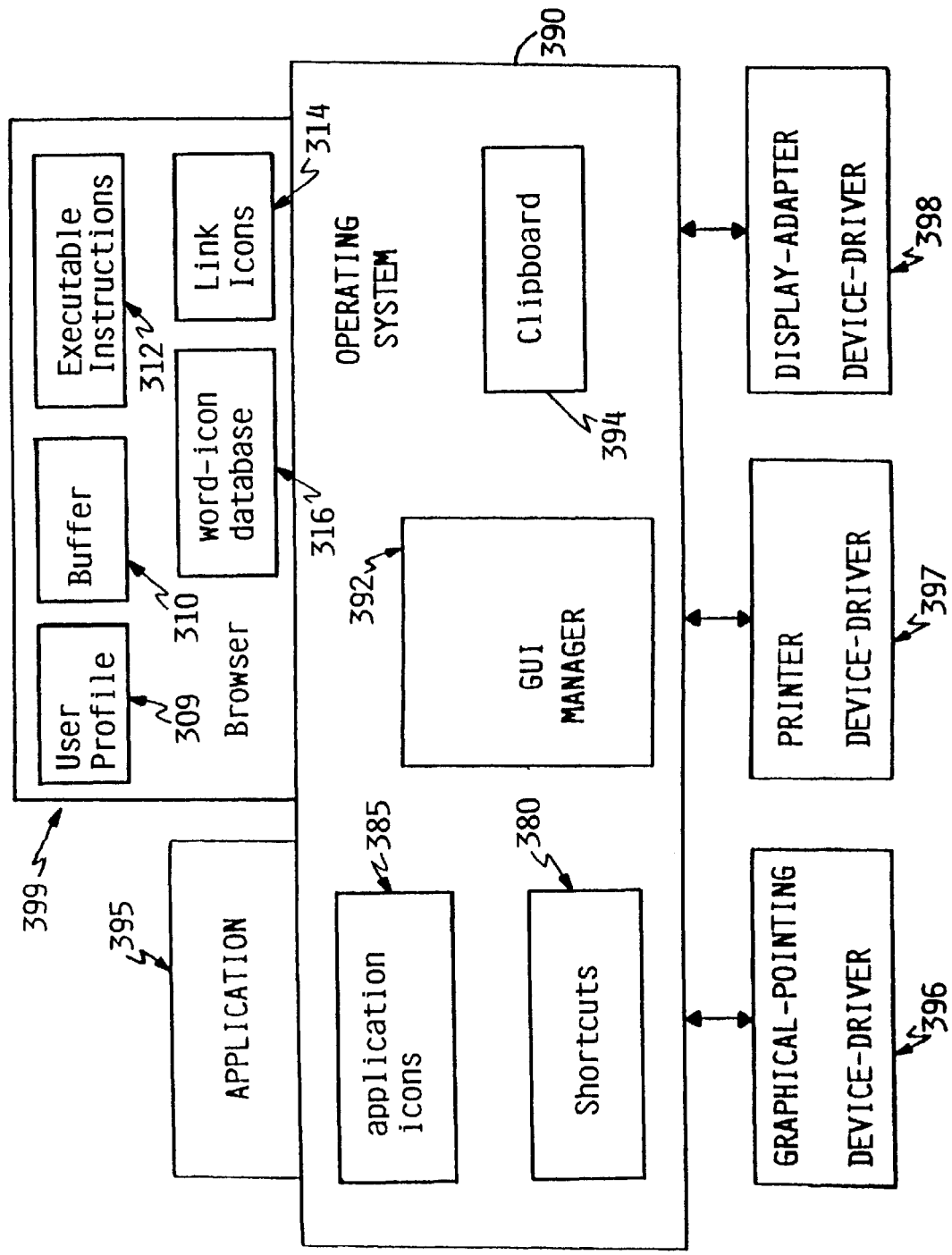
FIG. 3 is a block diagram of software stored within the memory of the computer system depicted in FIG. 1.

With reference now to FIG. 3, there is illustrated a block-diagram representation of the software configuration of computer system 110. As noted above, the software executed by computer system 110 can be stored within one or more of RAM 258, the nonvolatile storage provided by diskette drive 122, hard-disk drive 123, CD-ROM drive 124, or a remote server accessible via modem 287 or network adapter 285.

As illustrated, the software configuration of computer system 110 includes operating system 390, which is responsible for directing the operation of computer system 110. For example, operating systems typically include computer software for controlling the allocation and usage of hardware resources such as memory, CPU time, disk space, and peripheral devices. A suitable operating system 390 and associated graphical-user-interface manager 392 (e.g., Microsoft Windows, AIX, or OS/2 operating systems) could be used. Other technologies also could be utilized, such as touch-screen technology or human-voice control. The operating system is the foundation upon which applications 395, such word-processing, spreadsheet, and web-browser programs are built.

In accordance with the preferred embodiment, operating system 390 includes graphical-user-interface (GUI) 392 manager although they could be packaged separately. GUI 392 manages the graphical-user-interface with which a user of computer system 110 interacts. Operating system 390 also contains clipboard 394, shortcuts 380, and application icons 385, although they could be packaged separately. Clipboard 394 is a user-accessible buffer into which the user can copy or cut objects and from which the user can paste objects. Shortcuts 380 is a list of icons and executable programs; when the user selects one of the icons in the list, operating system 390 executes the associated program Application icons 385 is a list of icons that can be associated with applications. Operating system 390, applications 395, or browser 399 can provide the icons in application icons 385.

Operating system 390 communicates with applications 395 and browser 399 through messages conforming to the syntax of the application-program-interface (API) supported by operating system 390. Operating system 390 further communicates with graphical-pointing device-driver 396, printer device-driver 397, and display-adapter device-driver 398. For example, operating system 390 sends graphics data to display-adapter device-driver 398, which in turn translates the messages into bus signals utilized to control display adapter 270. In addition, graphical-pointing device-driver 396 translates signals from pointing device 118 through keyboard/pointing-device controller 284 into Cartesian coordinates and a selection status, which are then relayed to GUI manager 392. Also, operating system 390 sends printer-control codes and data to printer device-driver 397, which in turn translates the control codes and data into bus signals used to control printer 120.

Browser 399 contains user profile 309, buffer 310, executable instructions 312, link icons 314, and word-icon database 316. In an alternative embodiment, user profile 309, link icons 314, and word-icon database 316 could be packaged separately from browser 399. Although browser 399 is drawn as being separate from operating system 390, they could be packaged together.

Word-icon database 316 contains a database of words and icons associated with the words. It is possible for a word to have multiple, associated icons; for example, the word "telephone" might have associated with it icons of an antique telephone, a rotary-dial telephone, and a push-button telephone. It is also possible for an icon to have multiple, associated words; for example, the words "husband" and "father" might be associated with the same icon showing a picture of an adult male. The use of word-icon database 316 is further described below under the description for FIG. 20.

Referring again to FIG. 3, user profile 309 contains information that the user can set to direct the operation of browser 399. User profile 309 is further described below under the description of FIG. 8.

Referring again to FIG. 3, link-icons 314 contains a list of the icons and information about the icons. Browser 399 maintains link-icons 314. Link-icons 314 is further described below under the description of FIGS. 9 and 10.

Referring again to FIG. 3, CPU 226 is suitably programmed to carry out the preferred embodiment by executable instructions 312, as described in more detail in the flowcharts of FIGS. 16–21. In the alternative, the functions of FIGS. 16–21 could be implemented by control circuitry through the use of logic gates, programmable-logic devices, or other hardware components in lieu of a processor-based system.

Buffer 310 contains screen contents on which browser 399 performs transformations in order to create icons. Buffer 310 is further described below under the description for FIGS. 13, 14, 15, and 16–21.

Figure 4:
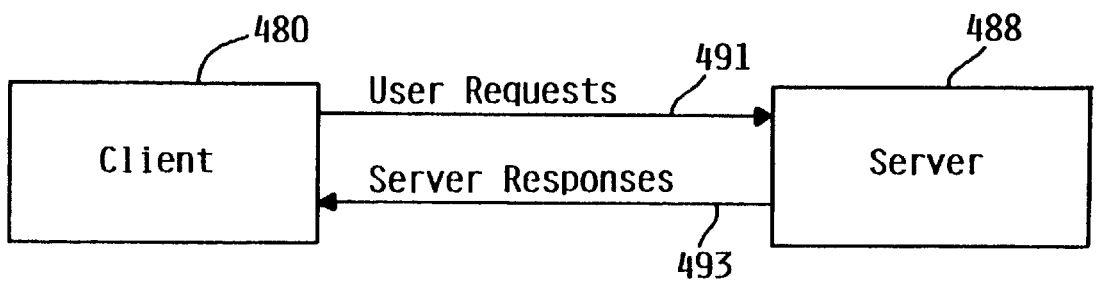
FIG. 4 is a block diagram illustrative of a client/server architecture in accordance with a preferred embodiment.

FIG. 4 is a block diagram illustrative of a client/server architecture, in accordance with a preferred embodiment. User requests 491 are sent by client process 480 to server 488. Server 488 can be a remote computer system accessible over a computerized, distributed-information resource such as the Internet or other communications network. Server 488 performs scanning and searching of information sources and, based upon these user requests, presents the filtered, electronic information as server responses 493 to the client process. The client process may be active in a first computer system (such as computer system 110), and the server process may be active in a second computer system, communicating with one another over a communications medium, thus providing distributed functionality and allowing multiple clients to take advantage of the information-gathering capabilities of the server.

Figure 5:
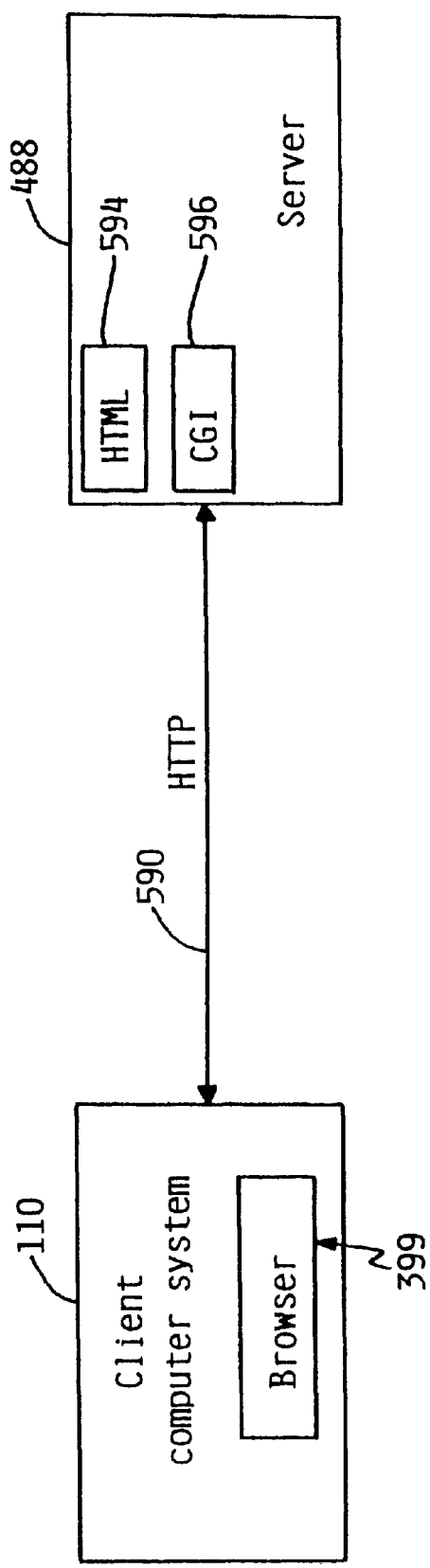
FIG. 5 is a detailed block diagram of a client/server architecture in accordance with a preferred embodiment.

FIG. 5 illustrates a detailed block-diagram of a client/server architecture in accordance with a preferred embodiment. Although the client and server are processes that are operative within two computer systems, these processes being generated from a high-level programming language (e.g., PERL), which is interpreted and executed in a computer system at runtime (e.g., a workstation), they could be implemented in a variety of hardware devices, either programmed or dedicated.

Computer system 110, functioning as a client, and server 488 communicate by utilizing the functionality provided by HTTP. Active within client 110 is a first client process, browser 399, which establishes connections with server 488 and presents information to the user.

Server 488 executes the corresponding server software, which presents information to the client in the form of HTTP responses 590. The HTTP responses 590 correspond with the web pages represented using HTML or other data generated by server 488. Server 488 provides HTML 594. Server 488 also provides Common Gateway Interface (CGI) 596, which allows client 110 to direct server 488 to commence execution of a specified program contained within server 488. This may include a search engine that scans received information in the server for presentation to the user controlling the client. Using this interface and HTTP responses 590, server 488 may notify client 110 of the results of that execution upon completion. Although the protocols of HTML, CGI, and HTTP are shown, any suitable protocols could be used.

Figure 6:
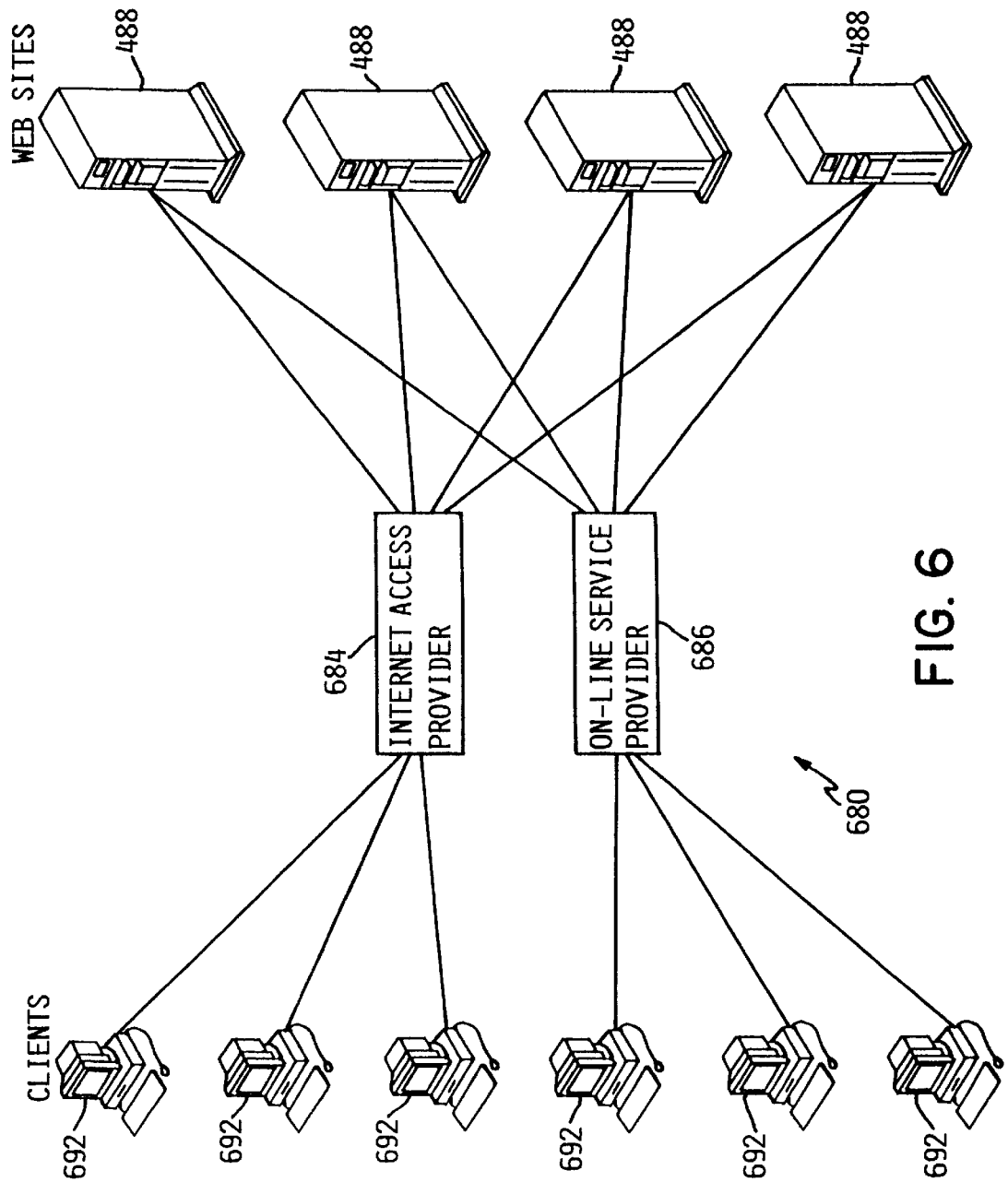
FIG. 6 is a diagram illustrative of a computer network that can be implemented in accordance with a preferred embodiment.

FIG. 6 is a diagram illustrative of a computer network 680, which can be implemented in accordance with a preferred embodiment of the present invention. Computer network 680 is representative of the Internet, which can be described as a known computer network based on the client-server model discussed herein. Conceptually, the Internet includes a large network of servers 488 that are accessible by clients 692, typically computers such as computer system 110, through some private Internet access provider 684 (e.g., Internet America) or an on-line service provider 686 (e.g., America On-Line, Prodigy, and Compuserve). Each of clients 692 may run browser 399 to access servers 488 via the access providers. Each server 488 operates a so-called "web site" that supports files in the form of documents or pages. A network path to servers 488 is identified by a Uniform Resource Locator (URL) having a known syntax for defining a network connection.

Figure 7:
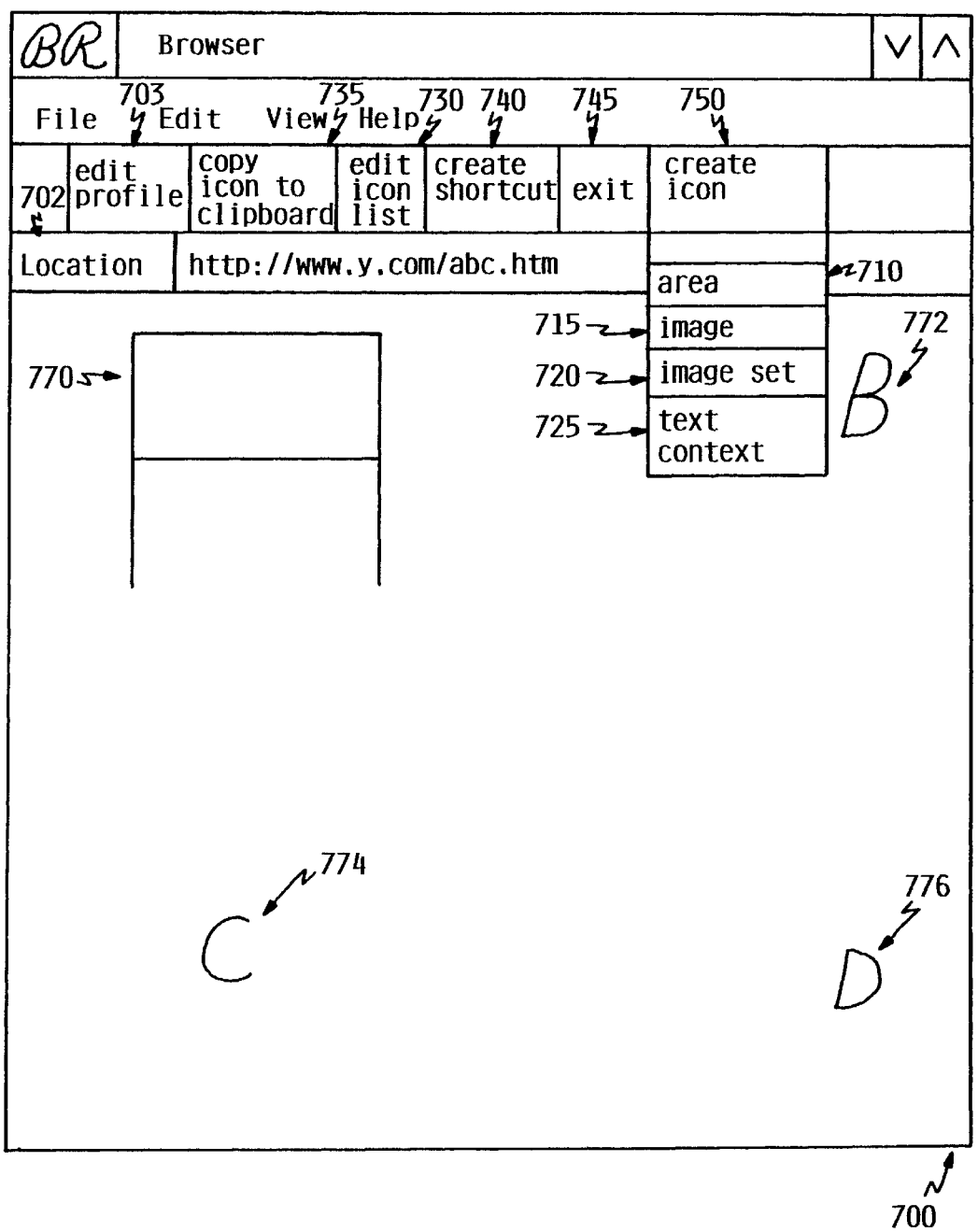
FIGS. 7 and 8 are pictorial representations of the interfaces that a user may operate to control the operation of a preferred embodiment.

FIG. 7 illustrates a pictorial representation of the interfaces that are used to control the operations of the preferred embodiment. FIG. 7 contains browser window 700, which is displayed on display screen 114. Browser window 700 contains URL 702, which is the address from which browser 399 downloaded the example page from a server. In this example, URL 702 is the fictitious web-page address "http://www.y.com/abc.htm". Browser window 700 also contains edit-profile button 703, copy icon-to-clipboard button 735, edit icon-list button 730, create-shortcut button 740, exit button 745, and create-icon button 750. The example page contents shown includes objects 770, 772, 774, and 776, which could be any displayed object, such as graphic images or text. The objects could be hotspots, meaning that they have an associated URL, such that when the user selects the object, browser 399 will retrieve its associated web page. Object 770 is a hotspot and is a graphic image containing a stylized "A". Object 772 is text containing "B". Object 774 is text containing "C". Object 776 is text containing "D".

Figure 8:
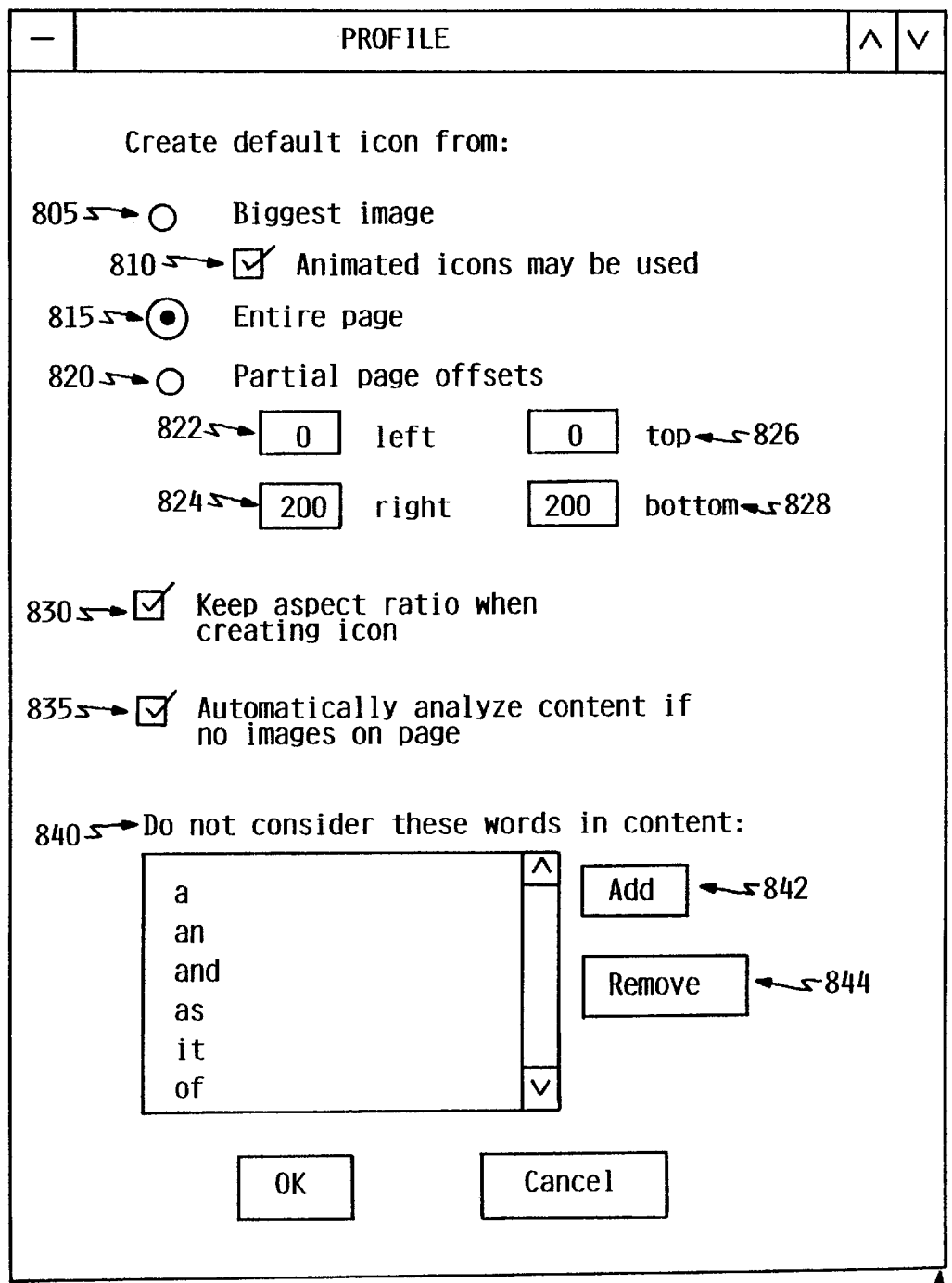

When the user selects edit-profile button 703, browser 399 displays the dialog shown in FIG. 8. Referring again to FIG. 7, when the user selects copy icon-to-clipboard button 735, browser 399 copies the selected icon to clipboard 394, as further described below under the description for FIG. 17. Referring again to FIG. 7, when the user selects edit icon-list button 730, browser 399 displays dialog 1000, as further described below under the description for FIG. 10. When the user selects create-shortcut button 740, browser 399 creates a shortcut icon and displays the shortcut icon on display screen 114, as further described below under the description for FIG. 17. A shortcut icon is an icon that, when selected by the user, causes an application to be invoked. Thus, the icon is a shortcut to the application. Referring again to FIG. 7, when the user selects exit button 745, browser 399 exits. When the user selects create-icon button 750, browser 399 displays a pull-down menu containing area button 710, image button 715, image-set button 720, and text-context button 725. Create-icon button 750 gives the user an opportunity to request that browser 399 create an application icon that reflects the current web-page and is associated with the browser. The application icon is displayed with the browser and also on the task bar, as further described below under the description for FIGS. 11b, 11c, and 16. Referring again to FIG. 7, area button 710 gives the user an opportunity to request that browser 399 create an application icon from a user-selected area within browser window 700, as further described below under the description for FIG. 16. Referring again to FIG. 7, image button 715 gives the user an opportunity to request that browser 399 create an application icon from a user-selected image in the displayed web page, as further described below under the description for FIG. 16. Referring again to FIG. 7, image-set button 720 gives the user an opportunity to request that browser 399 create an application icon from a user-selected image set in the displayed web page, as further described below under the description for FIG. 16. Referring again to FIG. 7, text-context button 725 gives the user an opportunity to request that browser 399 create an application icon from the textual content of the displayed web page, as further described below under the description for FIGS. 18 and 20.

Thus, FIG. 7 illustrates examples of the subset of the page that browser 399 uses to create the icon. The subset can be the entire page, an area of the page, an image in the page, an image set in the page, or textual content of the page. Further illustrations of subsets are shown below under the description for FIG. 8.

Referring to FIG. 8, there is illustrated a pictorial representation of example dialog 800 displayed by browser 399 in response to the user pressing edit-profile button 703. Browser 399 displays profile dialog 800, preloaded with the contents of user profile 309, on display screen 114, processes the data entered by the user, and saves the changes to user profile 309, as further described below under the description for FIG. 16. Referring again to FIG. 8, profile dialog 800 contains biggest image 805, animated icons 810, entire page 815, partial-page offsets 820, keep aspect-ratio 830, automatically-analyze contents 835, and ignored words 840. Partial-page offsets 820 contains left 822, right 824, top 826, and bottom 828. In the preferred embodiment, browser 399 provides some default words in ignored words 840, and the user may add words to ignored words 840 via add button 842, and remove words via remove button 844. In the example of FIG. 8, the contents of ignored words 840 are "a", "an", "and", "as", "it", and "of".

When selected, biggest image 805 directs browser 399 to create the default icon from the largest image in the current, displayed web page. In an alternative embodiment, browser 399 creates the default icon from the background, or wallpaper, image. When selected, animated icons 810 directs browser 399 to use animated icons in the web page when creating the default icon. When selected, entire page 815 directs browser 399 to use the entire page when creating the default icon. In this example, the user has selected entire page 815, which is indicated by the dot within the selection circle of entire page 815. When selected, partial-page offsets 820 directs browser 399 to use the contents of left 822, right 824, top 826, and bottom 828 for calculating the portion of the web page to be used in creating the default icon. The contents of left 822, right 824, top 826, and bottom 828 are specified in pixels. When selected, keep aspect-ratio 830 directs browser 399 to maintain the height and width of the image on the web page when creating the default icon. When selected, automatically-analyze contents 835 directs browser 399 to create the default icon from the text content of the web page when there are no images in the web page. When selected, ignored words 840 directs browser 399 to ignore the common words in the list when creating the default icon from the text content in the web page.

Thus, FIG. 8 illustrates examples of the subset of the page that browser 399 uses to create the icon. The subset can be the background or wallpaper image, the biggest image, a partial page determined by page offsets, or automatically-analyzed textual content.

Figure 9:
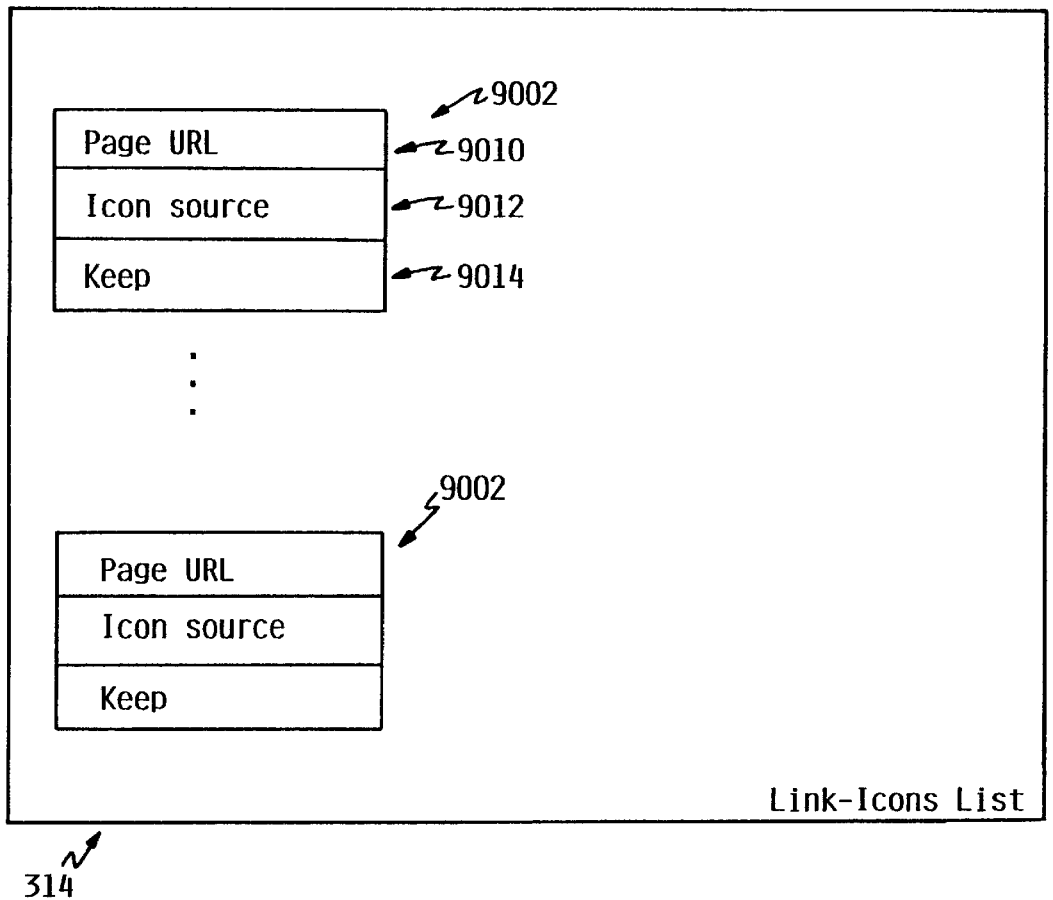
FIG. 9 is a pictorial representation of a primary data structure of the preferred embodiment.

Referring to FIG. 9, there is illustrated a block diagram of link icons 314. Link icons 314 contains a list of link-icon elements 9002. List element 9002 contains page URL 9010, icon source 9012, and keep/temporary indicator 9014. Link-icon list 314 is the primary data structure of the preferred embodiment, and it is used to manage the icons that browser 399 creates. Page URL 9010, icon source 9012, and keep/temporary indicator 9014 are further described below under the description for FIG. 10.

Figure 10:
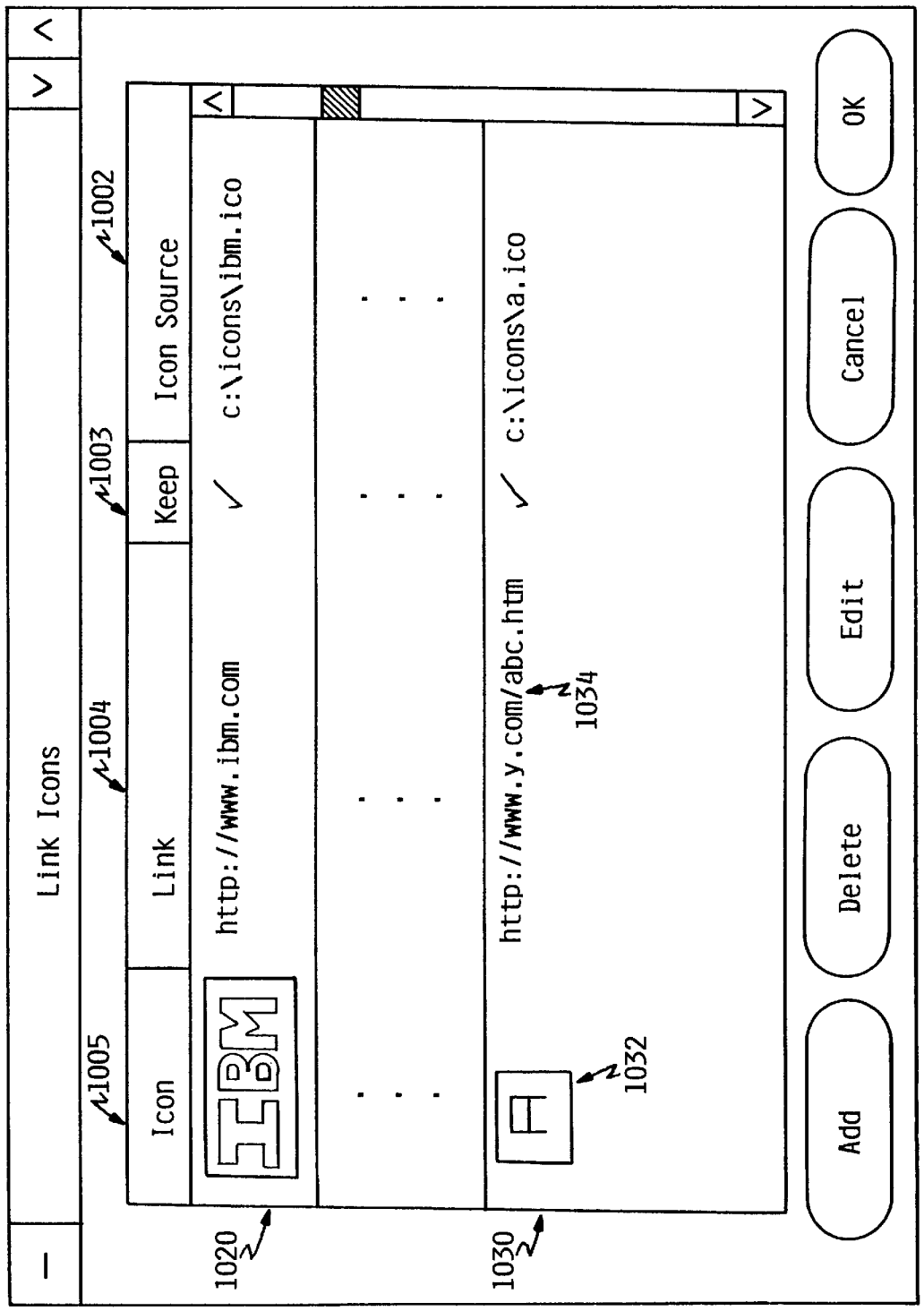
FIG. 10 is a pictorial representation of the interface that the user may operate to control the operation of the preferred embodiment.

Referring to FIG. 10, there is illustrated example dialog 1000 displayed on display screen 114 by browser 399 in response to the user pressing edit icon-list button 730. Browser 399 displays dialog 1000 to give the user an opportunity to edit the contents of link-con list 314. Dialog 1000 contains icon-source column 1002, keep/temporary indicator column 1003, link column 1004, and icon column 1005. Icon source 1002 displays the contents of and gives the user the opportunity to edit icon source 9012. Keep 1003 displays the contents of and gives the user the opportunity to edit keep/temporary indicator 9014. Link 1004 displays the contents of and gives the user the opportunity to edit page URL 9010. Icon 1005 displays the icon that is stored in icon source 1002. The example shown in FIG. 10 illustrates two example entries 1020 and 1030 in link icons 314. Column 1005 of entry 1030 contains icon 1032 with a stylized "A", which browser 399 created from object 770. Column 1004 of entry 1030 contains URL 1034 with contents: "http://www.y.com/abc.htm"; thus when icon 1032 is displayed on display 114, it represents the browser viewing the web page at URL 1034.

Column 1003 of entry 1030 contains a check mark, indicating that icon 1032 is to persist from one browser session to the next. Column 1002 of entry 1030 contains the contents: "c:\cons\a.ico", which is the location of icon 1032. Although two entries are displayed in dialog 1004 for link-icons list 314, there could be any number of entries.

Figure 11A:
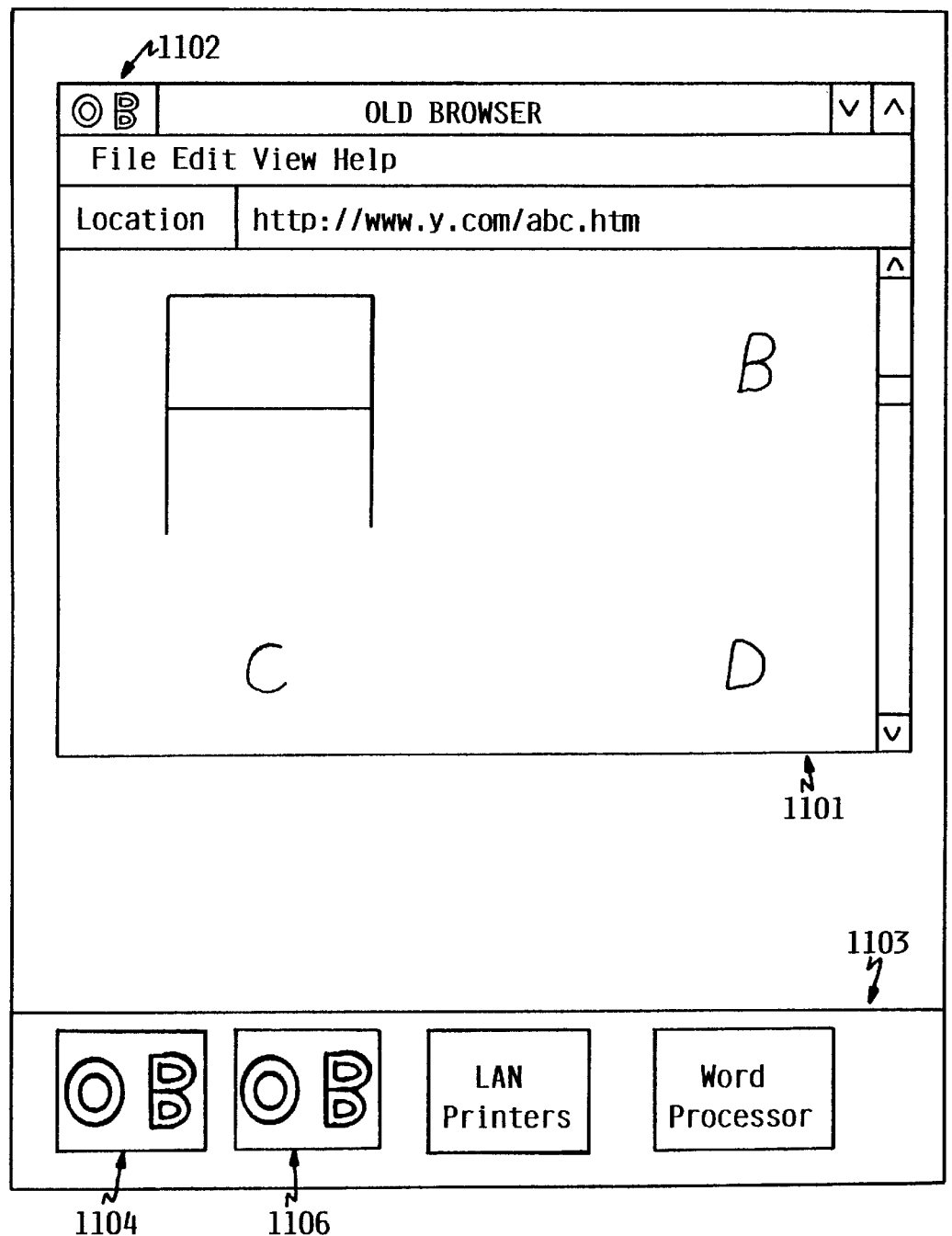
FIG. 11a is a pictorial representation of a prior art user interface.

Referring to FIG. 11a, there is illustrated a pictorial representation of a prior-art user interface. Browser window 1101 and taskbar 1103 are displayed on a display screen. The application icon associated with browser 1101 is icon 1102, which contains stylized letters "OB". Since the user has invoked browser 1101 twice, taskbar 1103 contains two identical icons representing the invocations, icons 1104 and 1106, both identical to icon 1102. Thus, the user cannot determine, without actually selecting the icons in the taskbar, which web page is associated with icon 1104 and which web page is associated with icon 1106.

Figure 11B:
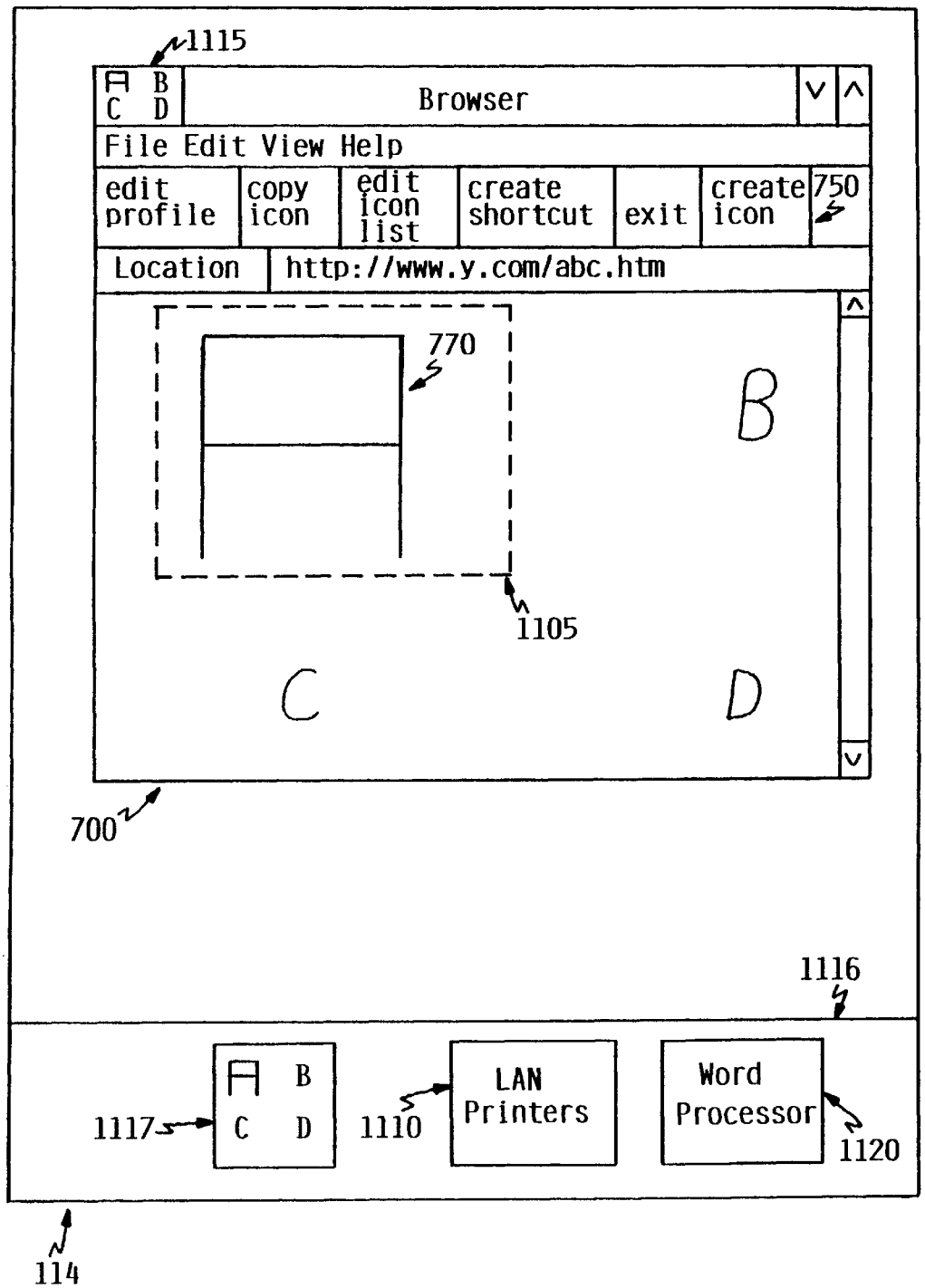
FIGS. 11b and 11c are pictorial representations of the user interface after operation of the preferred embodiment.

Referring to FIG. 11b, there is illustrated a pictorial representation of the contents of display screen 114 after operation of the preferred embodiment. Browser window 700 and taskbar 1116 are displayed on display screen 114. Taskbar 1116 contains icons representing active windows, which in this example are browser icon 1117, LAN-printers icon 1110, wordprocessor icon 1120. Icon 1117 represents browser window 700 and is identical to icon 1115 contained within browser window 700. Browser 399 created icons 1115 and 1117 as the default icons. Icons 1115 and 1117 contain the entire, current page contents scaled to icon size because the user previously selected entire page 815, as shown in FIG. 8. Referring again to FIG. 11, browser window 700 contains object 770, for which the user would like to create an icon, different from default icons 1115 and 1117, to represent this invocation of the browser. The user has indicated this desire by drawing block 1105 around image 770 and by selecting create-icon button 750 and then selecting area button 710, as previously described above under the description for FIG. 7. As an alternative way to select image 770, the user could have also, for example, clicked on image 770 using the right mouse button and then selected it using an option from a pop-up menu.

Figure 11C:
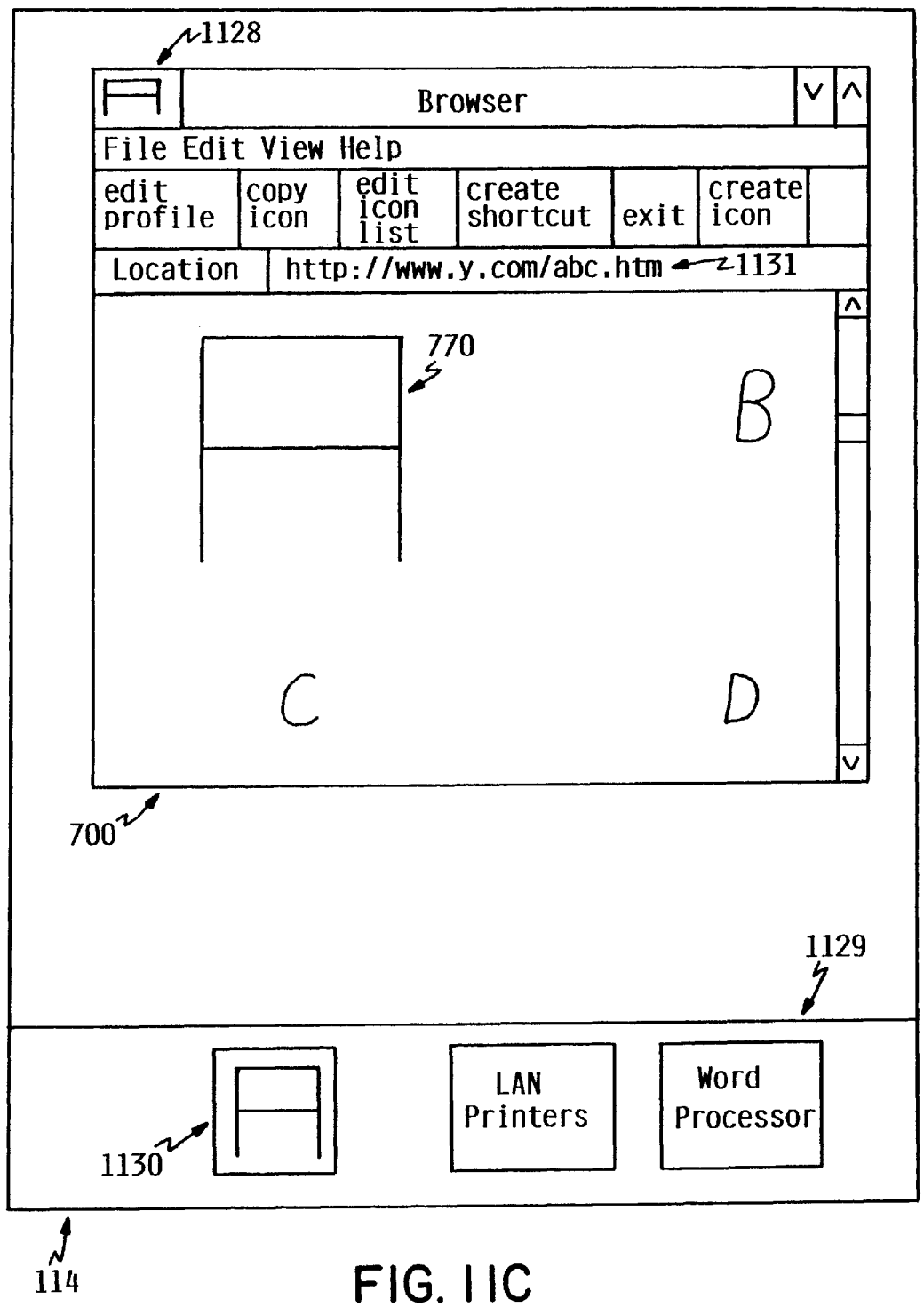

Referring to FIG. 11c, there is illustrated example contents of display screen 114 after browser 399 has created icon 1130 within taskbar 1129 and icon 1128 within browser window 700. Browser 399 can create icons 1128 in response to the user selecting area button 710, as shown in FIG. 11b. Referring again to FIG. 11c, browser 399 can also create icons 1128 and 1130 in response to the user selecting image option 715 or image 770. Also, browser 399 can create icons 1128 and 1130 as default icons in response to the user selecting a link having URL 1131 associated with it in a previous page (not shown) This creation process is further described below under the description for the flowcharts of FIGS. 16 and 19.

Figure 12:
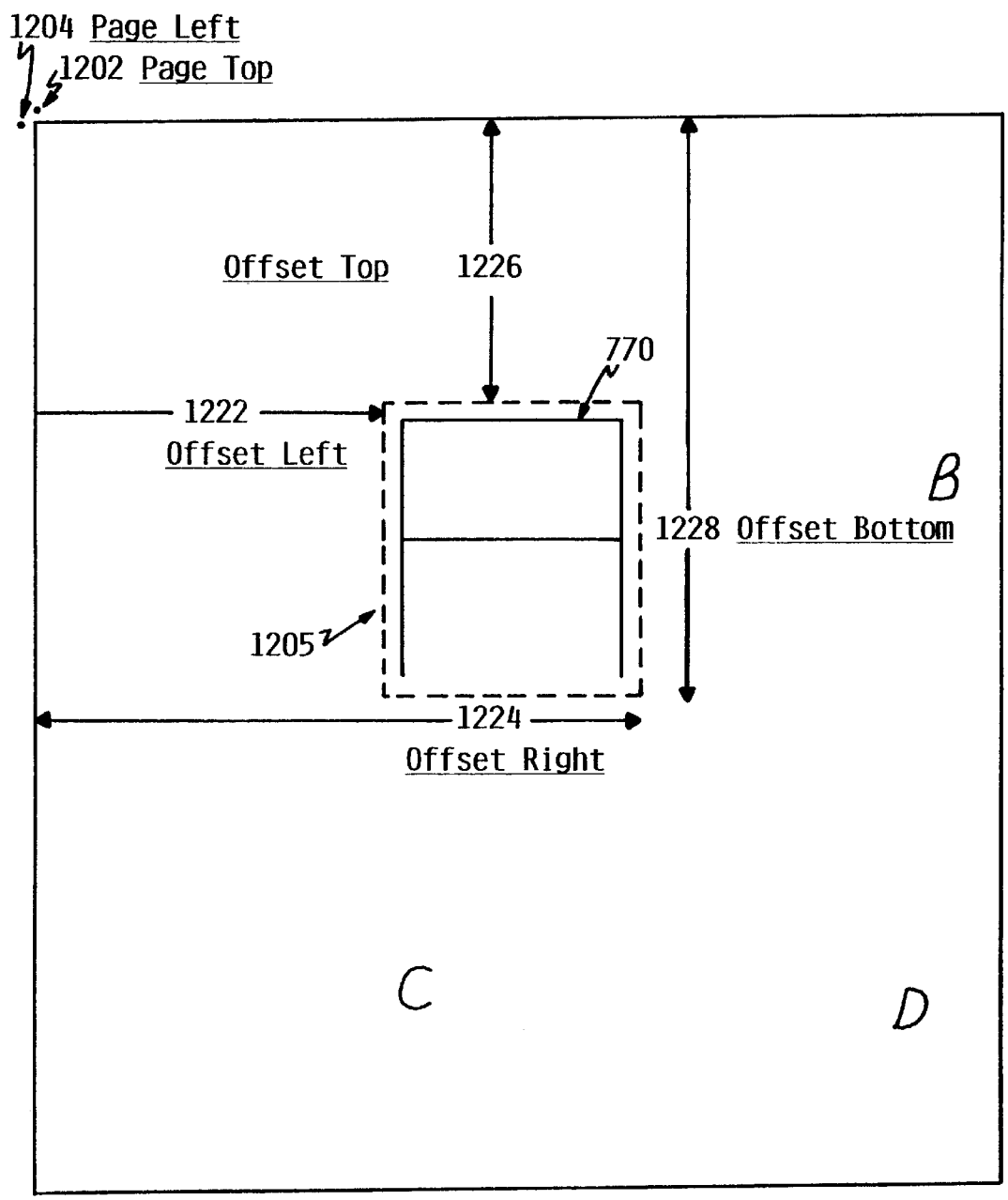
FIG. 12 is a pictorial representation of display-screen contents and associated parameters according to the preferred embodiment.

Referring to FIG. 12, there is illustrated a pictorial representation of display screen contents and associated screen coordinates of a displayed web page, which are laid out in a Cartesian coordinate system having a horizontal, x-axis and a vertical, y-axis. The page top is represented by reference element 1202, and the page left is represented by element 1204. Reference element 1226 is the offset from y-axis coordinate of page top 1202 to partial page 1205. Offset left 1222 is the offset from the x-axis coordinate of page left 1204 to partial page 1205. Offset right 1224 is the offset from the x-axis coordinate of page left 1204 to the right edge of partial page 1205. Offset bottom 1228 is the offset from the y-axis coordinate of page top 1202 to the bottom edge of partial page 1205. Offset left 1222 corresponds to partial-page-offset left 822. Offset top 1226 corresponds to partial-page-offset top 826. Offset bottom 1228 corresponds to partial-page-offset bottom 828. Offset right 1224 corresponds to partial-page-offset right 824. The use of the coordinates described in FIG. 12 is further described below under the description for FIG. 18.

Referring to FIG. 13, there is illustrated a pictorial representation of an example buffer-to-icon transformation performed by browser 399 in the preferred embodiment when the user has not selected keep aspect-ratio 830, as further described below under description for FIG. 19. Referring again to FIG. 13, browser 399 performs transformation process 1320 on buffer 1310 in order to create icon 1330. Buffer 1310 illustrates example contents of buffer 310. In this example, buffer 1310 has a width on the x-axis of four (as illustrated by element 1312), and a height on the y-axis of two (as illustrated by element 1314). The widths and heights of the buffer and icon in this example refer to relative ratios, not absolute values. Transformation process 1320 performs a one-quarter transformation on the x-axis and a one-half transformation on the y-axis, to yield icon 1330 with a width on the x-axis of one (1332) and a height on the y-axis of one (1334).

Referring to FIG. 14, there is illustrated a pictorial representation of an example buffer-to-icon transformation wherein the user has selected keep aspect-ratio 830 and the ratio of the buffer size on the x-axis divided by the icon size on the x-axis is greater than the buffer size on the y-axis divided by the icon size on the y-axis, as further described below under description for FIG. 19. Referring again to FIG. 14, browser 399 performs transformation process 1420 on buffer 1310 in order to create icon 1430. Buffer 1310 illustrates example contents of buffer 310. In this example, buffer 1310 has a width on the x-axis of four, as shown by element 1312, and a height on the y-axis of two, as shown by element 1314. The widths and heights of the buffer and icon in this example refer to relative ratios, not absolute values. Transformation process 1420 performs a one-quarter transformation on both the x-axis and the y-axis, to yield icon 1430 with a width on the x-axis of one (1432) and a height on the y-axis of one-half (1434). In the preferred embodiment, icons are square and have a ratio of 1:1, x-axis to y-axis, so browser 399 will need to pad icon 1430 to make it square.

Referring to FIG. 15, there is illustrated a pictorial representation of an example buffer-to-icon transformation. Buffer 1510 illustrates example contents of buffer 310. In this example, the user has selected keep aspect-ratio 830, and the width of buffer 1510 on the x-axis divided by the preferred width (1) of icon 1530 on the x-axis is greater than the height of buffer 1510 on the y-axis divided by the preferred height (1) of icon 1530 on the y-axis, as further described below under the description for FIG. 19. Referring again to FIG. 15, browser 399 performs transformation process 1520 on buffer 1510 in order to create icon 1530. In this example, buffer 1510 has a width on the x-axis of two (as illustrated by reference element 1512), and a height on the y-axis of three (as illustrated by reference element 1514). The widths and heights of the buffer and icon in this example refer to relative ratios, not absolute values. Transformation process 1520 performs a one-third transformation on both the x-axis and the y-axis, to yield icon 1530 with a width on the x-axis of two-thirds (as illustrated by reference element 1532) and a height on the y-axis of two (as illustrated by reference element 1534). In the preferred embodiment, icons are square and have a ratio of 1:1, x-axis to y-axis, so browser 399 will need to pad icon 1530 to make it square.

Figure 16:
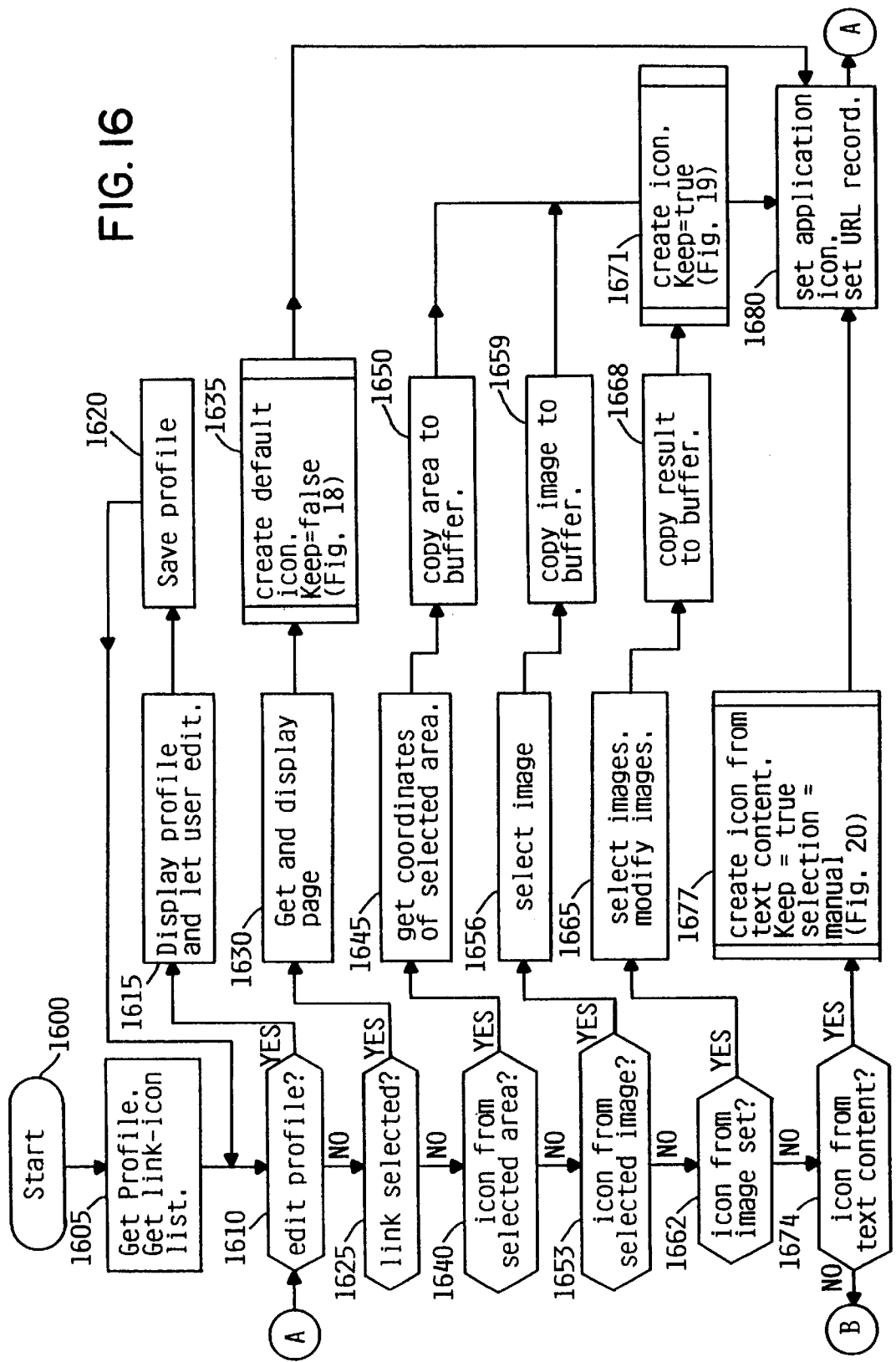

FIGS. 16–21 are flowcharts that describe the operation of the preferred embodiment. Referring to FIG. 16, there is illustrated an example of the main logic of browser 399 that responds to requests from the user. At block 1600, browser 399 starts. Control then continues to block 1605 where browser 399 retrieves user profile 309 and link-icon list 314. Control then continues to block 1610 where browser 399 determines whether the user has selected edit-profile button 703. If the determination at block 1610 is true, then control continues to block 1615 where browser 399 displays the contents of user-profile 309 to the user, as shown above in the example of FIG. 8, and allows the user to edit the contents. Referring again to FIG. 16, control then continues to block 1620 where browser 399 saves the changes that the user entered in user-profile 309. Control then returns to block 1610, as previously described above.

If the determination at block 1610 is false, then control continues to block 1625 where browser 399 determines whether the user has selected one of the links in the displayed web page. A common way for the user to select a link is to click on the image associated with the link. An example of such a link is shown in FIG. 7 as hot spot 770. Referring again to FIG. 16, if the determination at block 1625 is true, then control continues to block 1630 where browser 399 retrieves the web page associated with the user-selected link and displays it in the browser window. An example of such a browser window is shown in FIG. 7. Referring again to FIG. 16. Control then continues to block 1635 where browser 399 creates a default icon for the selected link, as described below under the description for FIG. 18. A default icon is an icon that browser 399 creates without any request from the user, and the default icon represents the page that browser 399 retrieves that is associated with the URL identified by the hotspot. Browser 399 passes an indication of "no keep" to the function of FIG. 18. Referring again to FIG. 16, control then continues to block 1680 where browser 399 sets the default, application icon associated with the selected link and created above in block 1635 by building the link-icon list element 9002 associated with the selected link. This building process includes building the link-icon list element 9002 associated with the selected link in link-icon list 314, setting the icon-source address 9012, retrieving the default, application icon 1005 created at block 1635, and displaying default, application icon 1005 on display screen 114 in the application and also in the task bar. An example of the display of the default, application icon is shown as elements 1128 and 1130 in FIG. 11c. Control then returns to block 1610, as previously described above.

If the determination at block 1625 is false, then control continues to block 1640 where browser 399 determines whether the user selected create-icon-from-area 710. If the determination at block 1640 is true, then control continues to block 1645 where browser 399 retrieves the screen coordinates of the area on display screen 114 that the user selected. (The screen coordinates are first measured relative to the window in which the area is contained, as shown in FIG. 12; then the coordinates are transformed to absolute screen coordinates.) The user could do this selection, for example, by drawing block 1105, as previously described above under the description for FIG. 1b. Referring again to FIG. 16, control then continues to block 1650 where browser 399 copies the contents of the user-selected screen-buffer area to buffer 310. Control then continues to block 1671 where browser 399 creates an icon for the image within the coordinates of the user-selected area, as described below under the description for FIG. 19. Referring again to FIG. 16, control then continues to block 1680 where browser 399 sets the application icon created above in block 1671 by building link-icon list element 9002. This building process includes building the link-icon list element 9002 associated with web page in link-icon list 314, setting the icon-source address 9012, retrieving the application icon 1005 created at block 1671, and displaying application icon 1005 on display screen 114 in the task bar and also in the application. An example of the display of the application icon is shown as elements 1128 and 1130 in FIG. 11c. Control then returns to block 1610, as previously described above.

If the determination at block 1640 is false, then control continues to block 1653 where browser 399 determines whether the user selected create-icon-from-image 715. If the determination at block 1653 is true, then control continues to block 1656 where browser 399 allows the user to select an image on display screen 114. The user can select an image by using pointing device 118. Control then continues to block 1659 where browser 399 copies the user-selected image to buffer 310. Control then continues to block 1671 where browser 399 creates an icon for the image selected by the user, as described below under the description for FIG. 19. Referring again to FIG. 16, control then continues to block 1680 where browser 399 sets the application icon created above in block 1671 by building link-icon list element 9002. This building process includes building the link-icon list element 9002 associated with web page in link-icon list 314, setting the icon-source address 9012, retrieving the application icon 1005 created at block 1671, and displaying application icon 1005 on display screen 114 in the task bar and also in the application. An example of the display of the application icon is shown as elements 1128 and 1130 in FIG. 11c. Control then returns to block 1610, as previously described above.

If the determination at block 1653 is false, then control continues to block 1662 where browser 399 determines whether the user selected create-icon-from-image-set 720. If the determination at block 1662 is true, then control continues to block 1665 where browser 399 allows the user to select a set of images on display screen 114 and allows the user to edit the selected images using a standard image-editor. Control then continues to block 1668 where browser 399 copies the edited images to buffer 310. Control then continues to block 1671 where browser 399 creates an icon for the image set selected by the user, as described below under the description for FIG. 19. Referring again to FIG. 16, control then continues to block 1680 where browser 399 sets the application icon created above in block 1671 by building link-icon list element 9002. This building process includes building the link-icon list element 9002 associated with web page in link-icon list 314, setting the icon-source address 9012, retrieving the application icon 1005 created at block 1671, and displaying application icon 1005 on display screen 114 in the task bar and also in the application. An example of the display of the application icon is shown as elements 1128 and 1130 in FIG. 11c. Control then returns to block 1610, as previously described above.

If the determination at block 1662 is false, then control continues to block 1674 where browser 399 determines whether the user has selected create-icon from text-content 725. If the determination at block 1674 is true, then control continues to block 1677 where browser 399 creates an icon from the text content of the displayed web page, as described below under the description for FIG. 20. Browser passes an indication of "keep" and "manual selection" to the function of FIG. 20. Referring again to FIG. 16, control then continues to block 1680 as previously described above.

Figure 17:
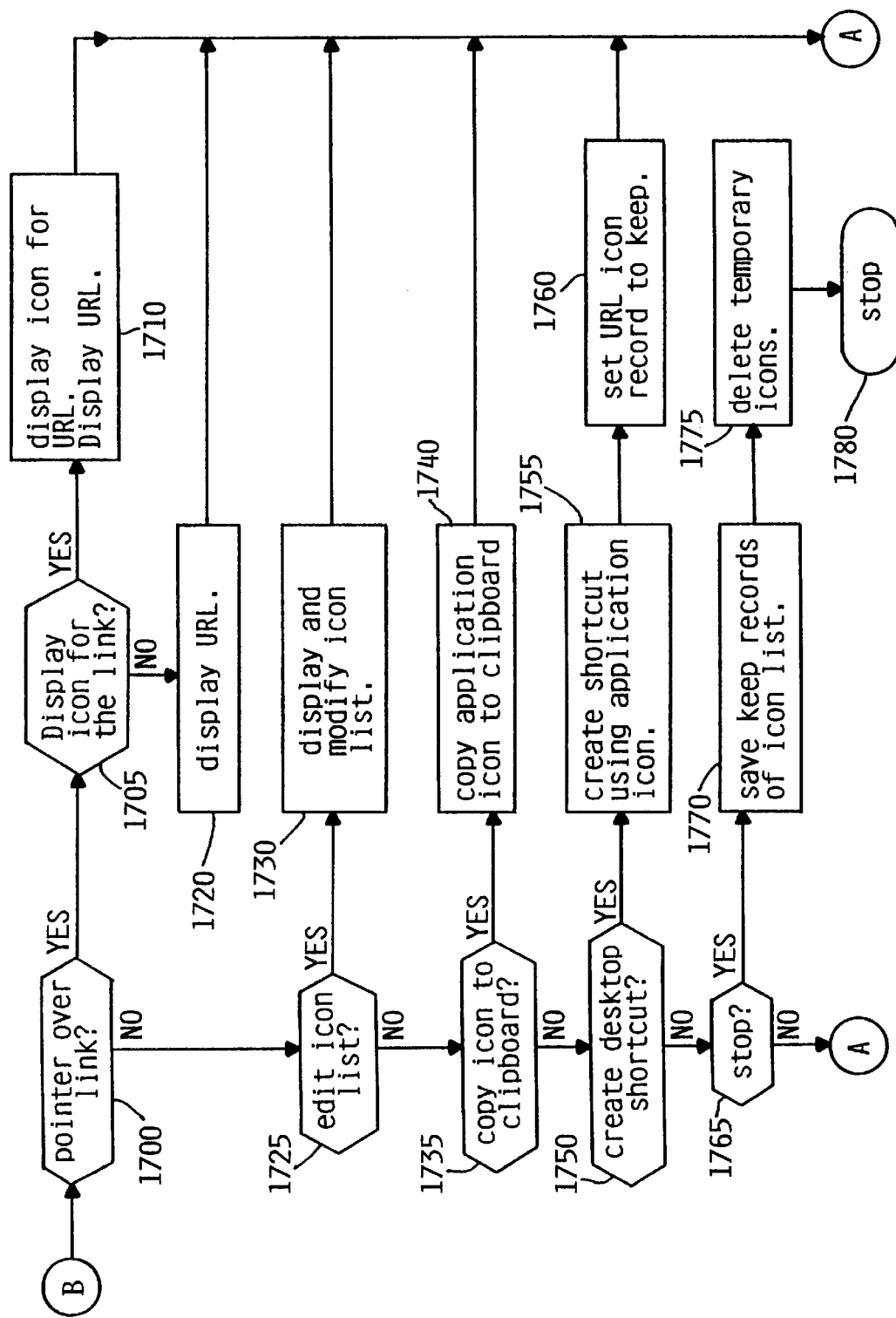

If the determination at block 1674 is false, then control continues to block 1700 in FIG. 17. At block 1700, browser 399 determines whether the user has passed the pointing-device pointer over a link on display screen 114. An example of a hot spot that contains a link is shown in FIG. 7 as element 770. Referring again to FIG. 17, if the determination at block 1700 is true, then control continues to block 1705 where browser 399 determines whether to display the icon for the URL link associated with the hot spot. Browser 399 bases this determination on whether the URL has an entry in link-icons list 314. If the determination at block 1705 is true, then browser 399 displays icon 9012 associated with this URL and displays URL 9010. Control then returns to block 1610, as previously described above.

If the determination at block 1705 is false, then browser 399 displays the URL associated with the link, which is contained in the web page. Control then returns to block 1610, as previously described above.

If the determination at block 1700 is false, then control continues to block 1725 where browser 399 determines whether the user has selected edit icon-list button 730. If the determination at block 1725 is true, then control continues to block 1730 where browser 399 displays the contents of link-icon list 314, as shown in the example of FIG. 10. Referring again to FIG. 17, browser 399 then allows the user to modify link-icon list 314. Control then returns to block 1610, as previously described above.

If the determination at block 1725 is false, then control continues to block 1735 where browser 399 determines whether the user has selected copy-icon-to-clipboard button 735. If the determination at block 1735 is true, then control continues to block 1740 where browser 399 copies the application icon selected by the user to clipboard 394. Control then returns to block 1610 as previously described above.

If the determination at block 1735 is false, then control continues to block 1750 where browser 399 determines whether the user has selected create-desktop-shortcut button 740. If the determination at block 1750 is true, then control continues to block 1755 where browser 399 creates a shortcut in shortcuts 380 for the application icon 1005 associated with the current URL displayed by browser 399. When the user selects create-desktop-shortcut button 740, browser 399 uses the URL currently shown along with the current application icon to create the shortcut in shortcuts 380.

Control then continues to block 1760 where browser 399 sets keep indicator 9014 in the link-icon list element 9002 associated with this application icon. Browser 399 sets keep indicator 9014 because shortcut icons are displayed on the desktop and persist between browser invocations. Control then returns to block 1610, as previously described above.

If the determination at block 1750 is false, then control continues to block 1765 where browser 399 determines whether the user has selected exit button 745. If the determination at block 1765 is true, then control continues to block 1770 where browser 399 saves all link-icon list elements 9002 that contain keep indicator 9014 of true in link-icon list 314. Control then continues to block 1775 where browser 399 deletes all link-icon list elements 9002 that contain keep indicator 9014 set to false. Control then continues to block 1780 where browser 399 stops.

If the determination at block 1765 is false, then control returns to block 1610, as previously described above.

Figure 18:
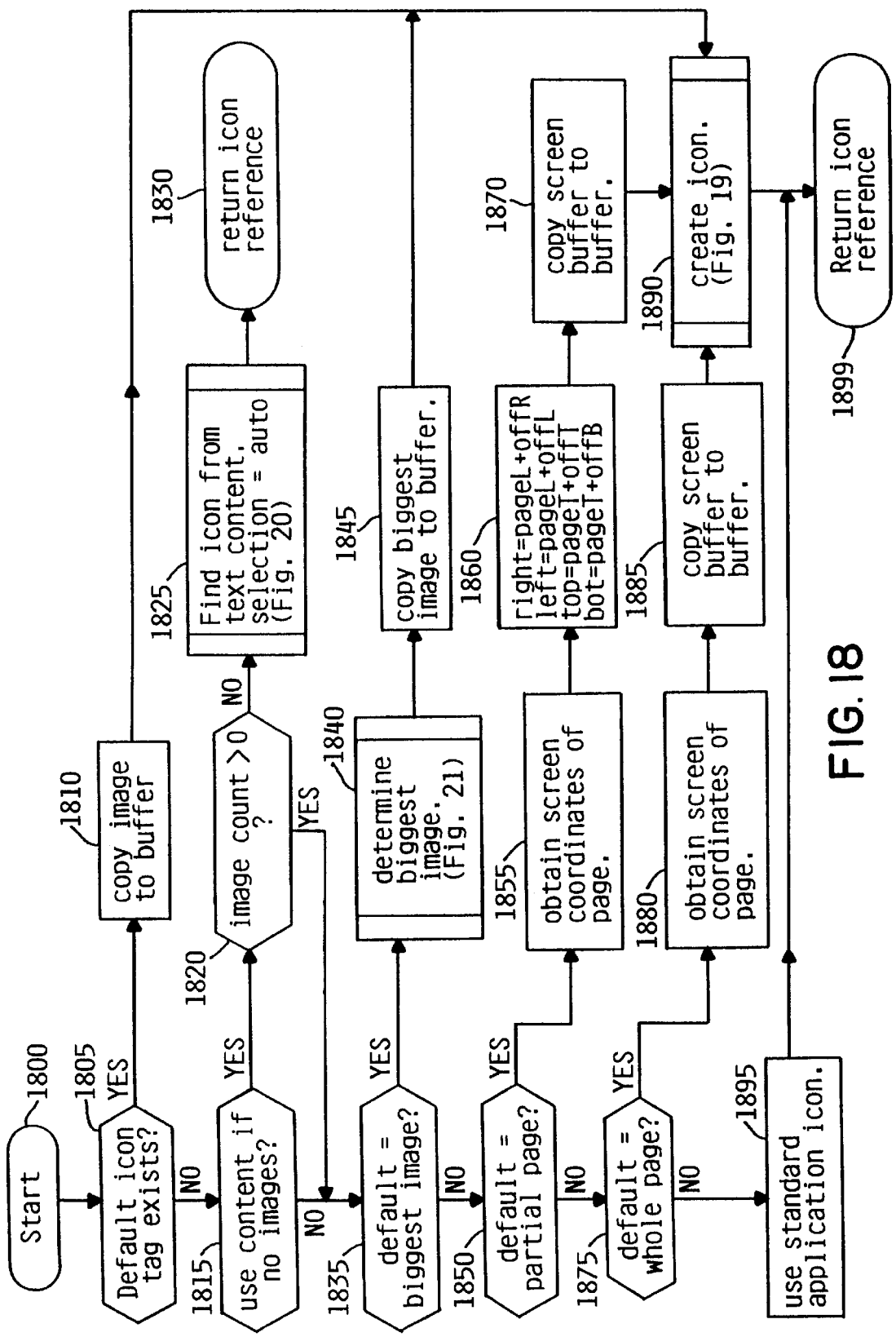

Referring to FIG. 18, there is illustrated a flowchart containing sample logic for a function that creates default icons. At block 1800 control beings. Control then continues to block 1805 where browser 399 determines if a default-icon HTML tag exists in the retrieved web page. A default-icon HTML tag, if it exists in the web page, specifies an icon or a web resource image to use as the default, application icon for the web page. If the determination at block 1805 is true, then control continues to block 1810 where browser 399 copies the image associated with the default-icon HTML tag to buffer 310. Control then continues to block 1890 where browser 399 creates an icon for the image, as further described below under the description for FIG. 19. Control then continues to block 1899 where the function returns a reference to the created icon.

If the determination at block 1805 is false, then control continues to block 1815 where browser 399 determines whether user profile 309 contains option 835, which directs browser 399 to automatically analyze and use the content of the web page to create an icon. If the determination at block 1815 is true, then control continues to block 1820 where browser 399 determines whether there are any images in the retrieved web page. If the determination at block 1820 is false, then control continues to block 1825 where browser 399 creates an icon from the text content of the retrieved web page, as further described below under the description for FIG. 20. Browser 399 passes an indication of automatic selection to the function of FIG. 20. Referring again to FIG. 18, control then continues to block 1830 where the function returns a reference to the created icon.

If the determination at block 1815 is false, or if the determination at block 1820 is true, then control continues to block 1835 where browser 399 determines whether user profile 309 contains biggest-image option 805. If the determination at block 1835 is true, then control continues to block 1840 where browser 399 determines the biggest image in the retrieved web page, as further described below under the description for FIG. 21. Referring again to FIG. 18, control then continues to block 1845 where browser 399 copies the biggest image to buffer 310. Control then continues to block 1890, as previously described above.

If the determination at block 1835 is false, then control continues to block 1850 where browser 399 determines whether user-profile 309 contains partial-page option 820. If the determination at block 1850 is true, then control continues to block 1855 where browser 399 obtains the screen coordinates of the page in the browser window, which are page-left coordinates 1204 (page L) and page-top coordinates 1202 (page T) in the example of FIG. 12. Referring again to FIG. 18, control then continues to block 1860 where browser 399 calculates the right, left, top, and bottom coordinates of partial-page 1205. In block 1860, "Page L" corresponds to page left 1204 in FIG. 12; "Page T" corresponds to page top 1202 in FIG. 12; "off R" corresponds to offset right 1224 in FIG. 12; "off L" corresponds to offset left 1222 in FIG. 12; "off T" corresponds to offset top 1226 in FIG. 12; and "off B" corresponds to offset bottom 1228 in FIG. 12.

Referring again to FIG. 18, control then continues to block 1870 where browser 399 copies the portion of the screen buffer identified by "right", "left", "top", and "bot" in block 1860 to buffer 310. Control then continues to block 1890 as previously described above.

If the determination at block 1850 is false, then control continues to block 1875 where browser 399 determines whether the contents of user profile 309 contains whole-page option 815. If the determination at block 1875 is true, then control continues to block 1880 where browser 399 obtains the screen coordinates of the entire page. Control then returns to block 1885 where browser 399 copies the entire screen to buffer 310. Control then continues to block 1890, as previously described above.

If the determination at block 1875 is false, then control continues to block 1895 where browser 399 selects the standard application-icon associated with the running application from application icons 385. Control then continues to block 1899 where browser 399 returns a reference to the icon.

Figure 19:
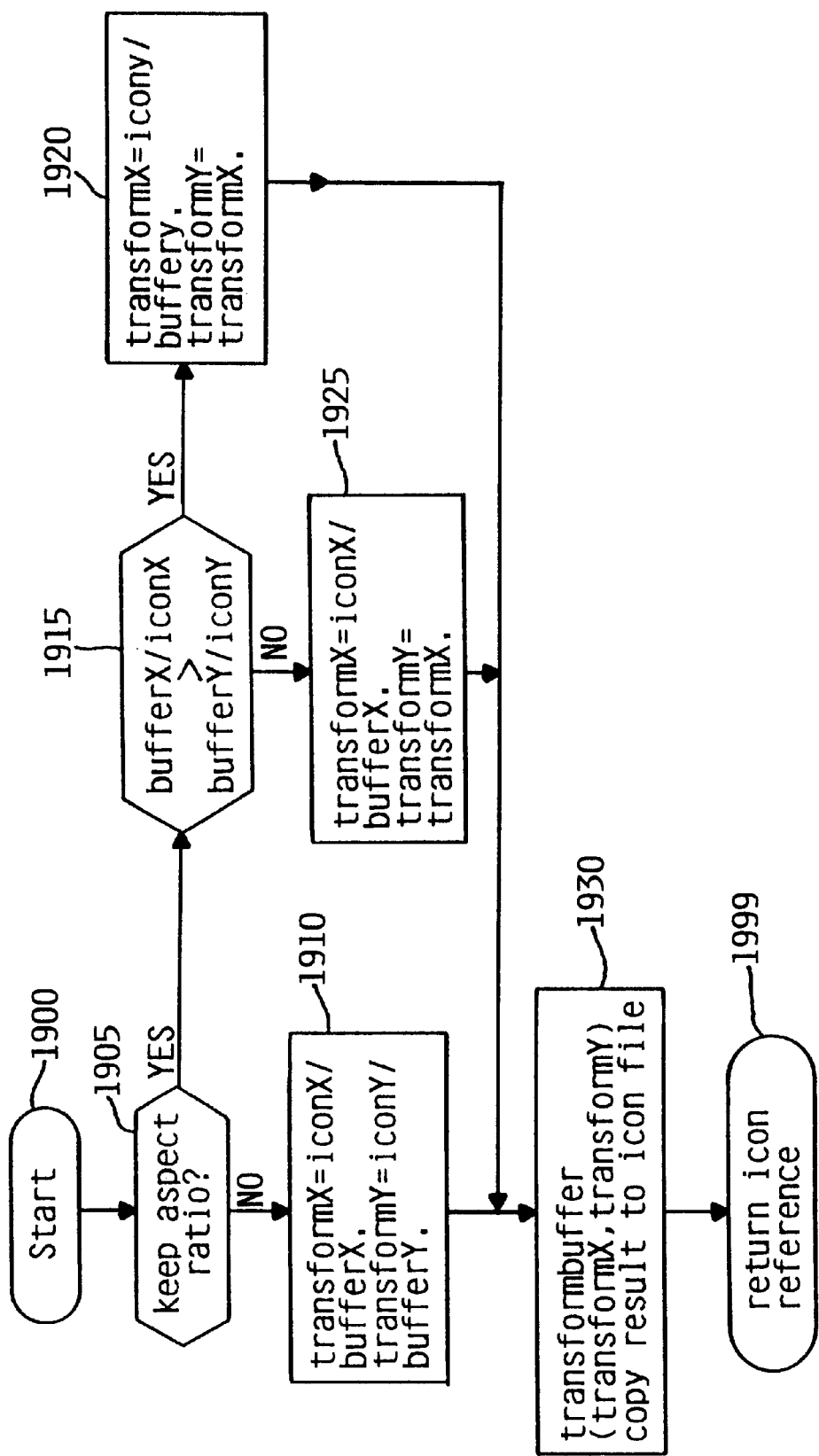

Referring to FIG. 19, there is illustrated a flowchart showing sample logic for the create icon function. At block 1900, control begins. Control then continues to block 1905 where browser 399 determines whether user profile 309 contains keep aspect-ratio option 830.

If the determination at block 1905 is false, then control continues to block 1910 where browser 399 calculates transform-x by dividing icon-x 1332 by buffer-x 1312. Browser 399 also calculates transform-y by dividing icon-y 1334 by buffer-y 1314.

Control then continues to block 1930 where browser 399 performs a transform-buffer operation using transform-x and transform-y previously calculated in block 1910, as shown at reference numeral 1320 in FIG. 13. The transform-buffer operation copies bitmap data from buffer 310 to the icon and compresses and scales the image according to the transform-x and transform-y parameters. The transform-buffer operation shown in block 1910 could be implemented using the StretchBlt function provided as an API in the Microsoft Windows operating system although StretchBlt has different input parameters than does the transform-buffer operation shown in block 1930. Any other appropriate compression and scaling function could also be used.

Referring again to FIG. 19, browser 399 then copies transform result 1330 to application icons 385. An example of the processing done by blocks 1910 and 1930 is shown FIG. 13. Control then continues to block 1919 where the function returns a reference to the created icon.

If the determination at block 1905 is true, then control continues to block 1915 where browser 399 determines whether buffer-x 1312 divided by icon-x is greater than buffer-y 1314 divided by icon-y. If the determination at block 1915 is false, then control continues to block 1925 where browser 399 calculates transform-x by dividing icon-x 1432 by buffer-x 1312. Browser 399 also sets transform-y to be equal to transform-x. Control then continues to block 1930 where browser 399 performs transfer-buffer operation 1420 and copies result 1430 to application icons 385. An example of the processing done by blocks 1925 and 1930 is shown in FIG. 14. Control then continues to block 1999 where the function returns a reference to the created icon.

If the determination at block 1915 is true, then control continues to block 1920 where browser 399 calculates transform-x to be icon-y 1534 divided by buffer-y 1514. Browser 399 then sets transform-y equal to transform-x. Control then continues to block 1930 where browser 399 performs transfer-buffer operation 1520 to yield result 1530 and copies the result to application icons 385. An example of the processing done by blocks 1920 and 1930 is shown in FIG. 15. Control then continues to block 1999 where the function returns a reference to the created icon.

Figure 20A:
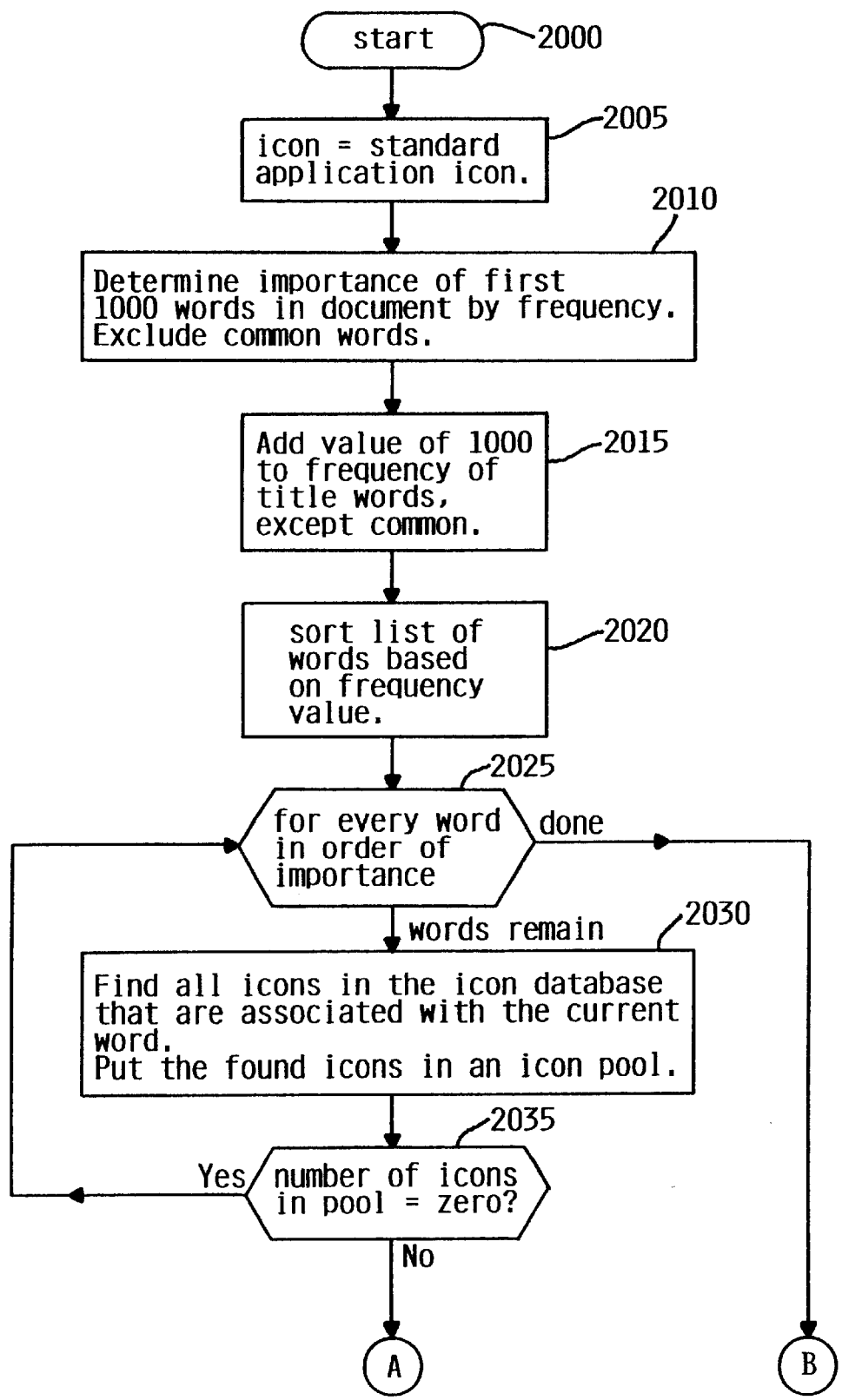
Figure 20B:
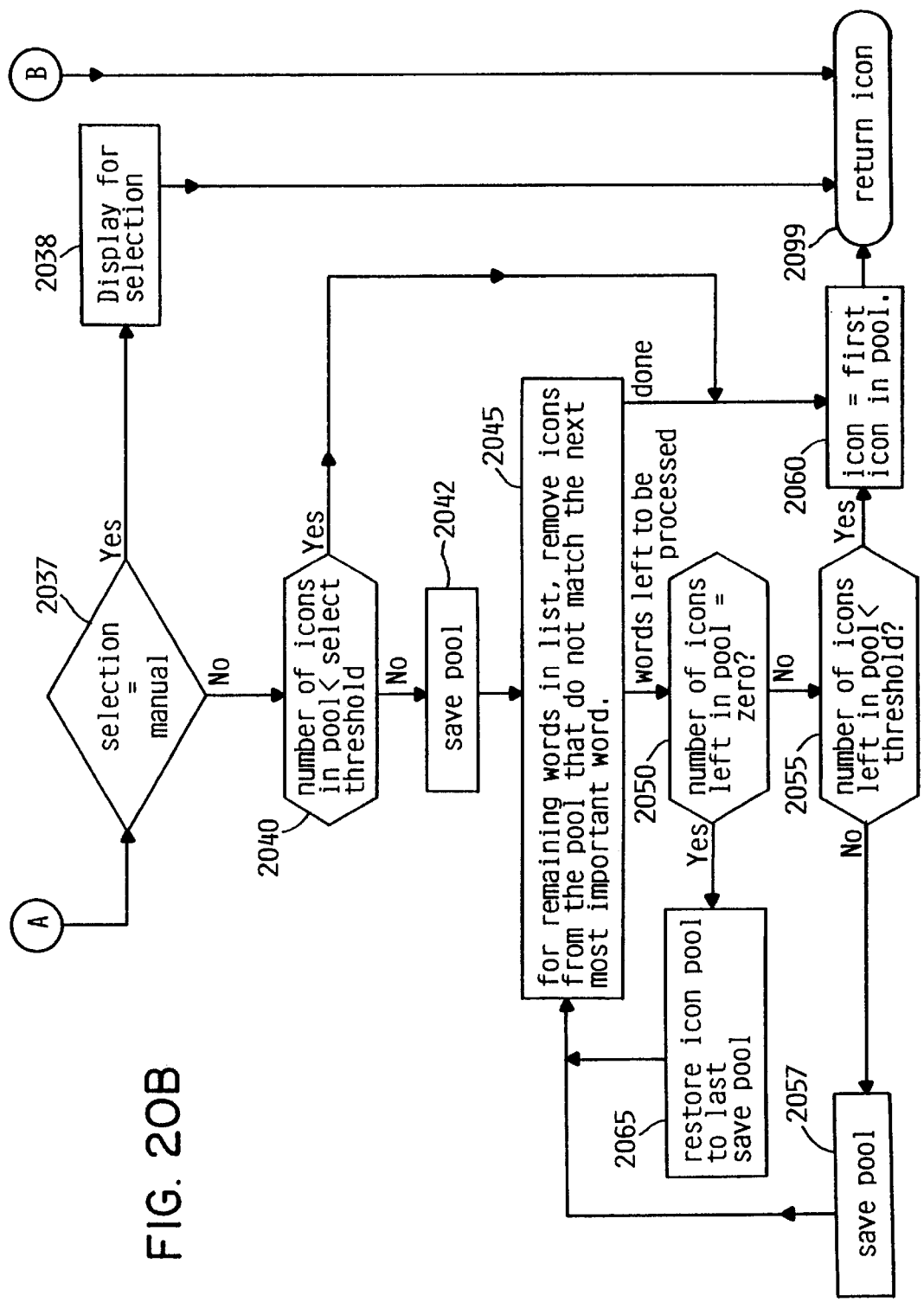

Referring to FIG. 20 there is illustrated a flowchart containing sample logic for the create icon-from-text-content function. At block 2000 control begins. Control then continues to block 2005 where browser 399 sets the icon variable to be the standard application-icon associated with the running application, found in application icons 385. Control then continues to block 2010 where browser 399 determines the importance of the first one thousand words in the web page by frequency of occurrence. One thousand is a predetermined constant used in the preferred embodiment, but an alternative embodiment could use any appropriate number. Browser 399 excludes HTML tags and the common words contained in element 840 of user profile 309 from this determination. Control then continues to block 2015 where browser 399 adds the value of one thousand, which is an example of a predetermined constant, to the frequency calculated in block 2010 for the title words, excluding the common words listed in block 840 of user profile 309. Control then continues to block 2020 where browser 399 sorts the list of one thousand frequent words based on their frequency value previously determined in blocks 2010 and 2015.

Control then continues to block 2025 where browser 399 begins the execution of a loop that is executed for every word in the word list starting with the most-important word. As long as there are words remaining in the list left to be processed, control continues to block 2030 where browser 399 finds all icons in word-icon database 316 associated with the current word and puts the found icons in an icon pool. Control then continues to block 2035 where browser 399 determines whether the number of icons in the pool equals zero. If the determination at block 2035 is true, then control returns to block 2025 and the loop represented by blocks 2025, 2030, and 2035 continues until either all words in the list have been exhausted, which is represented by the "done" leg of block 2025, or until one of the words in the list has at least one associated icon, which is represented by the "words remain" leg of block 2035.

When the determination at block 2035 is false, then control continues to block 2037 where browser determines whether manual selection was passed as an input parameter to the logic of FIG. 20.

If the determination at block 2037 is true, then control continues to block 2038 where browser 399 displays the icons in the pool to the user, who may pick one. Control then continues to block 2099 where the logic of FIG. 20 returns the selected icon.

If the determination at block 2037 is false, then control continues to block 2040 where browser 399 determines whether the number of icons in the pool is less than a selection threshold, which is a predetermined constant. The purpose of the selection threshold is to cause browser 399 to just pick one icon from the pool when the pool is small (the number of icons in the pool is less than the selection threshold), but to continue to winnow the pool when the pool is large (the number of icons in the pool is greater than the selection threshold). Thus, when the determination at block 2040 is true, then control continues to block 2060 where browser 399 sets the icon to be returned to be the first icon in the pool. Control then continues to block 2099 where the icon is returned.

When the determination at block 2040 is false, then control continues to block 2042 where browser 399 saves the current pool. Control then continues to block 2045 where browser 399 removes all icons from the pool that do not match (i.e., the icon and the word are not associated according to word-icon list 316) the next-most-important word in the word list. Thus, when there are many icons in the pool to choose from, browser 399 tries to find an icon that is associated with multiple words in the web page. Blocks 2045, 2050, 2055, and 2065 represent a loop that is executed as long as there are words in the list left to be processed. When there are no words left in the list to be processed, then the "done" leg of block 2045 is taken, which causes control to continue to block 2060, as previously described above.

As long as there are decreasing words of importance in the pool, control continues from block 2045 to block 2050 where browser 399 determines whether the number of icons left in the pool is zero. If the determination at block 2050 is true, then there are no icons left in the pool and control continues to block 2065 where browser 399 restores the icon pool to its last saved state, so that a new filter can be attempted.

When the determination at block 2050 is false, then control continues to block 2055 where browser 399 determines whether the number of icons left in the pool is less than a selection threshold, which is a predetermined constant. When the determination at block 2055 is false, then control continues to block 2057 where browser 399 saves the pool. Control then returns to block 2045, as previously described above.

When the determination at block 2055 is true, then control continues to block 2060 as previously described above.

Figure 21:
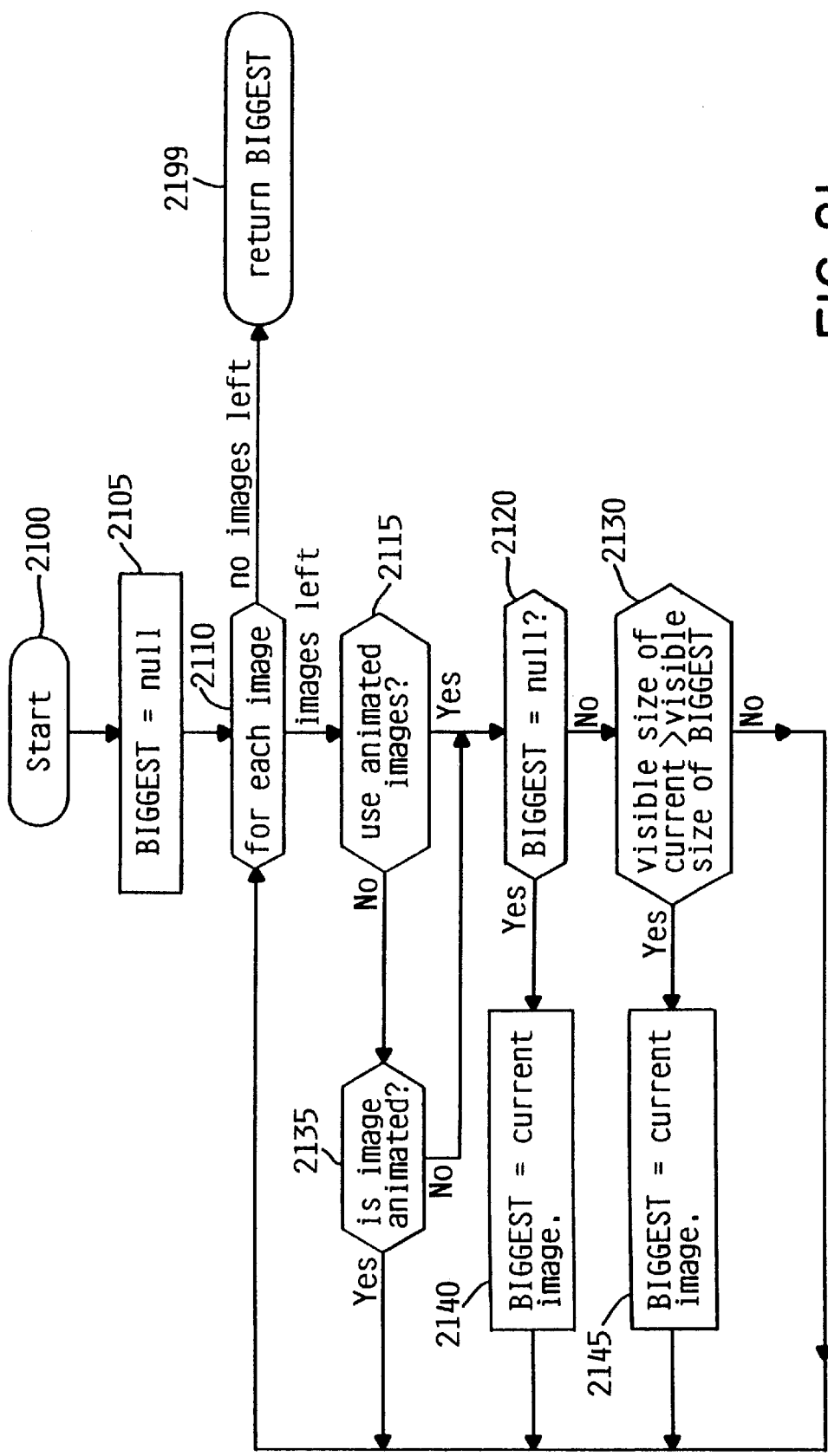

Referring to FIG. 21, there is illustrated a flowchart that contains sample logic for determining the biggest image on the display screen. At block 2100 control begins. Control then continues to block 2105 where browser 399 sets the variable "BIGGEST" to be null. Control then continues to block 2110 where a loop is begun that processes every image in the display screen. When there are no images left to be processed, then control continues to block 2199 where the variable "BIGGEST" is returned as the largest image.

As long as there are images left to be processed, control continues from block 2110 to block 2115 where browser 399 determines whether animated icons option 810 in user profile 309 is on. When the determination at block 2115 is false, then animated images may not be used, so control continues to block 2135 where browser 399 determines whether the current image is animated. If the determination at block 2135 is true, then control returns to block 2110 for processing of the next image, as previously described above.

If the determination at block 2135 is false, or the determination at block 2115 is true, then control continues to block 2120 where browser 399 determines whether the BIGGEST variable equals null. If the determination at block 2120 is true, then control continues to block 2140 where browser 399 sets the BIGGEST variable to the current image. Control then returns to block 2110 for processing of the next image, as previously described above.

If the determination at block 2120 is false, then control continues to block 2130 where browser 399 determines whether the visible size (number of pixels) of the current image is greater than the visible size of the image in the BIGGEST variable. If the determination at block 2130 is true, then control continues to block 2145 where browser 399 sets the BIGGEST variable to equal the current image. Control then returns to block 2110 for processing of the next image, as previously described above.

If the determination at block 2130 is false, then control returns directly to block 2110 for processing of the next image on display screen 114, as previously described above.

While this invention has been described with respect to the preferred and alternative embodiments, it will be understood by those skilled in the art that various changes in detail may be made therein without departing from the spirit, scope, and teaching of the invention. For example, icons may become widely employed in consumer applications such as operator panels for consumer electronics, appliances, and automobiles. Further, while the preferred embodiment has been described in terms of a browser displaying web pages, any application that displays information could be used. For example, a word-processing application displays pages of text and graphics, a spreadsheet application displays pages of numbers, and a drawing application displays pages of images. Accordingly, the herein disclosed invention is to be limited only as specified in the following claims.

What is claimed is:

1. A method for generating an iconic representation of a web browser session, said method comprising:
    accessing a web page from the World Wide Web in said browser session;
    displaying said web page on a display;
    selecting a subset of the page, said subset being defined according to at least one user input;
    automatically transforming the subset to an icon, wherein the icon is smaller than the page, whereby the icon contains at least some information derived from said subset of the page; and
    displaying the iconic representation of the web browser session on said display, said iconic representation being user selectable to invoke the web browser session.

2. The method of claim 1, wherein the displaying step is in response to a user selecting a link, wherein the link is contained in another page.

3. The method of claim 1, wherein the iconic representation further comprises a shortcut to an application.

4. The method of claim 1, wherein the step of displaying the iconic representation further comprises displaying the iconic representation in a taskbar on the display.

5. The method of claim 1, wherein the selecting step further comprises calculating the subset based on a biggest image in the page.

6. The method of claim 1, wherein the selecting step further comprises calculating the subset based on text content in the page.

7. The method of claim 6, wherein the selecting step further comprises selecting the subset based on frequency of words in the page.

8. The method of claim 7, wherein the selecting step further comprises selecting the subset based on frequency of words in a title in the page.

9. The method of claim 7, wherein the selecting step further comprises ignoring common words in the page.

10. The method of claim 7, wherein the transforming step further comprises mapping a word in the subset to an icon based on a word-icon database.

11. The method of claim 1, wherein the selecting step further comprises calculating the subset based on a default-icon tag in the page.

12. The method of claim 1, wherein the transforming step further comprises deciding whether to retain an aspect ratio of the subset.

13. The method of claim 12, wherein the transforming step further comprises determining whether the width of the subset divided by the width of the icon is greater than the height of the subset divided by the height of the icon.

14. The method of claim 13, wherein when the determining step is false, the transforming step further comprises:
    scaling the subset on a x-axis and a y-axis by a ratio, wherein the ratio is calculated by dividing the icon width by the subset width.

15. The method of claim 13, wherein when the determining step is true, the transforming step further comprises:
    scaling the subset on a x-axis and a y-axis by a ratio, wherein the ratio is calculated by dividing the icon height by the subset height.

16. The method of claim 12, wherein when the deciding step is false, the transforming step further comprises:
    scaling the subset on a x-axis by a first ratio, wherein the first ratio is calculated by dividing the icon width by the subset width; and
    scaling the subset on a y-axis by a second ratio, wherein the second ratio is calculated by dividing the icon height by the subset height.

17. An apparatus for browsing the World Wide Web, comprising:
    a processor;
    memory coupled to the processor;
    a browser residing in the memory and executing on the processor, wherein said apparatus is capable of generating multiple browser sessions concurrently, each session accessing a respective web page, and wherein a browser session displays a web page on a display, selects a subset of the web page, said subset being defined according to at least one user input, and transforms the subset to an icon representing the browser session, wherein the icon is smaller than the page, whereby the icon contains at least some information derived from said subset of the web page, wherein a user may invoke the browser session by selecting said icon representing the browser session.

18. The apparatus of claim 17, wherein the browser session displays the web page in response to a user selecting a link, wherein the link is contained in another page.

19. The apparatus of claim 1, wherein the icon further comprises a shortcut to invoke the browser and display the web page.

20. The apparatus of claim 17, wherein the browser further displays the icon in a taskbar on the display.

21. The apparatus of claim 17, wherein the browser further substitutes the icon for an application icon, wherein the application icon identifies the browser.

22. The apparatus of claim 17, wherein the browser further calculates the subset based on a biggest image in the page.

23. The apparatus of claim 17, wherein the browser further calculates the subset based on text content in the page.

24. The apparatus of claim 23, wherein the browser further selects the subset based on frequency of words in the page.

25. The apparatus of claim 24, wherein the browser further selects the subset based on frequency of words in a title in the page.

26. The apparatus of claim 24, wherein the browser further ignores common words when calculating the frequency of words in the page.

27. The apparatus of claim 24, wherein the browser further maps a word in the subset to an icon based on a word-icon database.

28. The apparatus of claim 17, wherein the browser further calculates the subset based on a default-icon tag in the page.

29. The apparatus of claim 17, wherein the browser further decides whether to retain an aspect ratio of the subset.

30. The apparatus of claim 29, wherein the browser further determines whether the width of the subset divided by the width of the icon is greater than the height of the subset divided by the height of the icon.

31. The apparatus of claim 30, wherein when the determination is false, the browser further:
scales the subset on a x-axis and a y-axis by a ratio, wherein the browser calculates the ratio by dividing the icon width by the subset width.

32. The apparatus of claim 30, wherein when the determination is true, the browser further:
scales the subset on a x-axis and a y-axis by a ratio, wherein the browser calculates the ratio by dividing the icon height by the subset height.

33. The apparatus of claim 29, wherein when the decision is false, the browser further:
scales the subset on a x-axis by a first ratio, wherein the browser calculates the first ratio by dividing the icon width by the subset width, and
scales the subset on a y-axis by a second ratio, wherein the browser calculates the second ratio by dividing the icon height by the subset height.

34. A program product that generates an icon, comprising:
a browser for use in a multitasking system that supports multiple concurrent browser sessions, each session accessing a respective web page, wherein a browser session displays a web page on a display, selects a subset of the web page, said subset being defined according to at least one user input, and transforms the subset to an icon representing the browser session, wherein the icon is smaller than the page, whereby the icon contains at least some information derived from said subset of the web page, whereby a user may invoke the browser session by selecting said icon representing the browser session; and
signal-bearing media bearing the browser.

35. The program product of claim 34, wherein the browser displays the web page in response to a user selecting a link, wherein the link is contained in another page.

36. The program product of claim 34, wherein the icon further comprises a shortcut to invoke the browser and display the page.

37. The program product of claim 34, wherein the browser further displays the icon in a taskbar on the display.

38. The program product of claim 34, wherein the browser further substitutes the icon for an application icon, wherein the application icon identifies the browser.

39. The program product of claim 34, wherein the browser further calculates the subset based on a biggest image in the page.

40. The program product of claim 34, wherein the browser further calculates the subset based on text content in the page.

41. The program product of claim 40, wherein the browser further selects the subset based on frequency of words in the page.

42. The program product of claim 41, wherein the browser further selects the subset based on frequency of words in a title in the page.

43. The program product of claim 41, wherein the browser further ignores common words when calculating the frequency of words in the page.

44. The program product of claim 41, wherein the browser further maps a word in the subset to an icon based on a word-icon database.

45. The program product of claim 41, wherein the browser further calculates the subset based on a default-icon tag in the page.

46. The program product of claim 41, wherein the browser further decides whether to retain an aspect ratio of the subset.

47. The program product of claim 46, wherein the browser further determines whether the width of the subset divided by the width of the icon is greater than the height of the subset divided by the height of the icon.

48. The program product of claim 46, wherein when the decision is false, the browser further:
scales the subset on a x-axis by a first ratio, wherein the browser calculates the first ratio by dividing the icon width by the subset width, and
scales the subset on a y-axis by a second ratio, wherein the browser calculates the second ratio by dividing the icon height by the subset height.

49. The program product of claim 46, wherein when the determination is false, the browser further:
scales the subset on a x-axis and a y-axis by a ratio, wherein the browser calculates the ratio by dividing the icon width by the subset width.

50. The program product of claim 46, wherein when the determination is true, the browser further:
scales the subset on a x-axis and a y-axis by a ratio, wherein the browser calculates the ratio by dividing the icon height by the subset height.

51. A method of user interface in a multitasking system, comprising the steps of:
presenting to a user a web page of data, said web page being presented in a window representing a session of an interactive web browser application for browsing the World Wide Web on a display of said multitasking system;
receiving a user selection to iconize said window;
identifying, according to at least one user input, a subset of said web page of data to be used in generating an icon;
automatically generating a customized icon for said window from said identified subset of said web page of data, said customized icon displaying at least some information constructed from said identified subset of said web page of data, said customized icon being smaller than said window; and
replacing said window with said customized icon.

52. The method of user interface in a multitasking system of claim 51, wherein said step of identifying a subset of said page of data to be used in generating an icon comprises retrieving at least one user-alterable parameter from a profile, and using said at least one user-alterable parameter to identify said subset of said page of data.

53. The method of user interface in a multitasking system of claim 51, wherein said step of automatically generating a customized icon comprises graphically mapping said subset of said page of data from a first area in said page to a second area in said icon, said second area being smaller than said first area.

* * * * *